United States Patent [19]

Hiramatsu et al.

[11] Patent Number: 4,933,983
[45] Date of Patent: Jun. 12, 1990

[54] IMAGE DATA READING APPARATUS

[75] Inventors: Akira Hiramatsu; Yuichi Sato; Tokuichi Tsunekawa; Shigeki Yamada; Takeshi Kobayashi, all of Yokohama; Makoto Katsuma, Wako, all of Japan

[73] Assignee: Canon Kabushiki Kaisha, Tokyo, Japan

[21] Appl. No.: 13,731

[22] Filed: Feb. 11, 1987

[30] Foreign Application Priority Data

| Feb. 14, 1986 | [JP] | Japan | 62-31689 |
| Feb. 14, 1986 | [JP] | Japan | 62-31690 |
| Feb. 14, 1986 | [JP] | Japan | 62-31691 |
| Feb. 14, 1986 | [JP] | Japan | 62-31692 |
| Mar. 4, 1986 | [JP] | Japan | 62-46870 |
| Mar. 4, 1986 | [JP] | Japan | 62-46871 |
| Mar. 4, 1986 | [JP] | Japan | 62-46872 |
| Mar. 4, 1986 | [JP] | Japan | 62-46873 |
| Mar. 4, 1986 | [JP] | Japan | 62-46874 |

[51] Int. Cl.⁵ .................................................. G06K 9/00
[52] U.S. Cl. .......................................... 382/8; 356/237; 358/106; 382/1
[58] Field of Search ............ 358/106, 163, 314, 346; 382/8, 54, 1; 356/237

[56] References Cited

U.S. PATENT DOCUMENTS

| 4,148,065 | 4/1979 | Nakagawa et al. | 358/106 |
| 4,314,281 | 2/1982 | Wiggins et al. | 382/54 |
| 4,448,526 | 5/1984 | Miyazawa | 356/237 |
| 4,598,997 | 7/1986 | Steigmeier et al. | 356/237 |
| 4,648,053 | 3/1987 | Fridge | 382/8 |
| 4,652,125 | 3/1987 | Bowen et al. | 356/237 |
| 4,659,220 | 4/1987 | Bronte et al. | 356/237 |
| 4,691,365 | 9/1987 | Nagashima | 382/54 |
| 4,692,690 | 9/1987 | Hara et al. | 358/106 |
| 4,701,784 | 10/1987 | Matsuoka et al. | 358/163 |
| 4,703,442 | 10/1987 | Levine | 358/163 |
| 4,707,734 | 11/1987 | Labinger et al. | 358/106 |

Primary Examiner—Leo H. Boudreau
Attorney, Agent, or Firm—Fitzpatrick Cella Harper & Scinto

[57] ABSTRACT

An image data reading apparatus includes a photoelectric conversion device for converting image data on an original into electric signals, a light source for illuminating the original, a detector for detecting the shading correction values for the light source and the photoelectric conversion device, and an image processor for effecting shading correction on the video data output from the photoelectric conversion device with the shading correction value detected by the correction value detector.

18 Claims, 38 Drawing Sheets

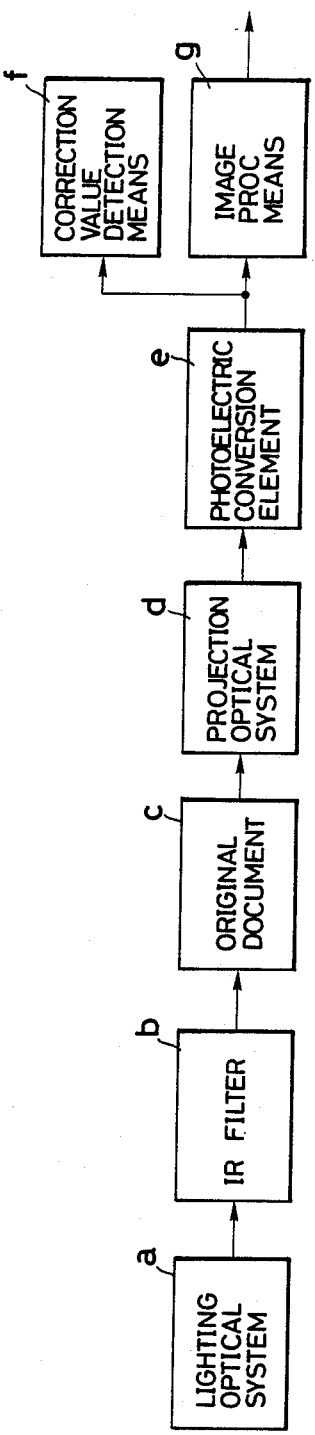

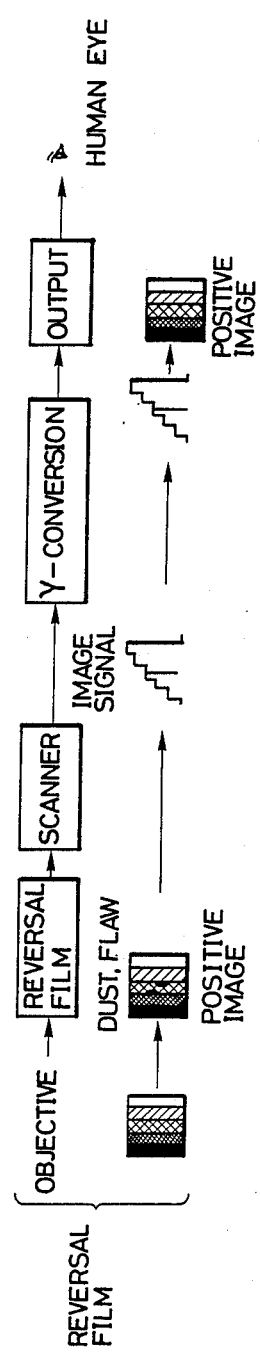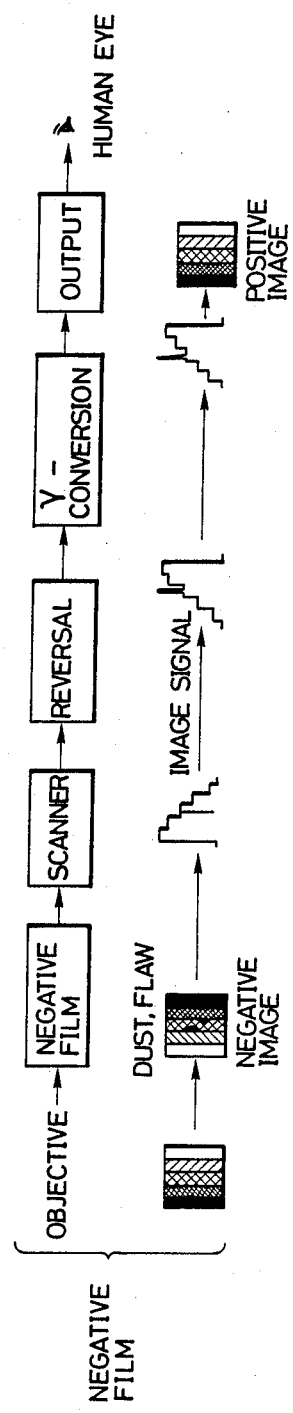

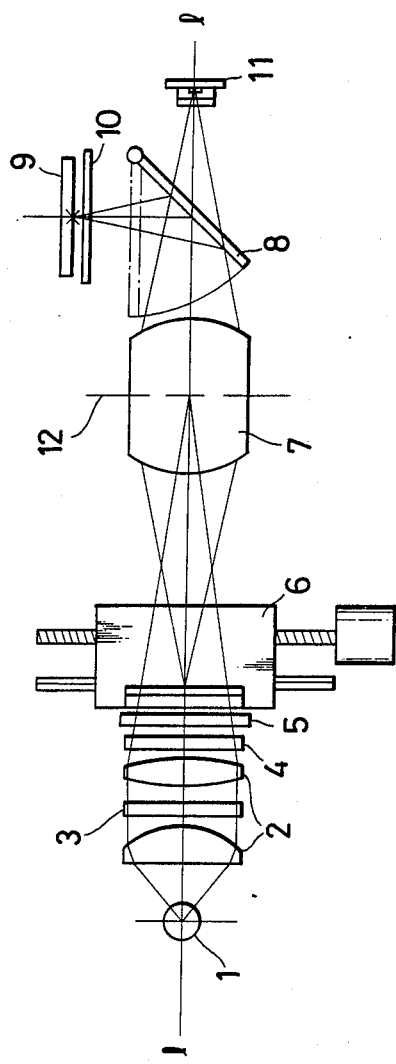

IMAGE DATA READING APPARATUS

BACKGROUND OF THE INVENTION

1. Field of the Invention

The present invention relates to an image data reading apparatus which is capable of obtaining image data from an original document through the operation of a photoelectric conversion means. More particularly, the invention is concerned with an image data reading apparatus having a shading correction function.

2. Related Background Art

Hitherto, image data reading apparatus have been known in which the image formed by light transmitted through a transparent color original is color-separated into three primary colors such as red (R), green (G) and blue (B), and three types of image signals corresponding to respective colors, derived from an image pickup device, are converted into digital image data signals.

These known apparatus suffer from the disadvantage that the quality of the image data is degraded due to unevenness or lack of uniformity in the read image data due to various reasons such as uneven illumination of the transparent color original by the lighting system, and vignette by the projection system which projects the image of the transparent color original to the image pickup device.

In order to obviate this problem, it has been proposed to effect on the read image data a correction corresponding to any unevenness of the illumination intensity. This method, however, encounters a problem in that, when the original is read during a change in magnification, the extent of the unevenness in the illumination intensity is changed by the magnification of the projection lens so that the correction value obtained with the original cannot be used directly.

This problem would be overcome by arranging the unevenness in the illumination intensity to be measured after determination of the magnification so as to enable the correction value to be changed each time the magnification is changed.

However, a problem is still encountered particularly in the case where only a part of the image frame is cut out and read or when the projecting magnification is to be changed. Namely, in such a case, a preferred process includes projection of the image on the finder system and trimming of the projected image through a visual check. However, when the original image is projected on the finder system, the unevenness in the illumination intensity cannot be measured because the transparent original is placed in the path of the light, that the correction value cannot be determined precisely.

Another problem encountered by the conventional apparatus is that the correct measurement of unevenness in the illumination intensity is often not obtained due to dust, flaw or other contaminants attaching to the original holder or the optical system. Any dust attaching to the lighting optical system and the projection optical system, as well as dust attaching to the original film or a scratch and other defects in the film, appear as black dots or lines in the image data, thus impairing the quality of the image data read from the original.

FIGS. 2A and 2B schematically show the manner in which the image data and the output image are influenced by dust and defects, as observed in the cases where the film is a reversal (positive) film and a negative film, respectively.

As will be seen from these Figures, any dust or defect appear as black dots on the image signals when the original film is read through scanning by a film scanner followed by conversion into image signals, regardless of whether the film is a reversal (positive) film or a negative film.

In the case where the film is a reversal (positive) film, the image signals are delivered to the output device, e.g., a printer through an image processing such as $\gamma$ correction, so that the influence of the dust and defects directly appear as black dots in the output image, as will be seen from FIG. 2A.

On the other hand, as shown in FIG. 2B, when the film is a negative film, the image signals read by the film scanner are subtracted from the image signals which are obtained by reading at full level, thus effecting conversion from negative image to positive image so that the dust and defects cause white bright spots.

In order to eliminate these problems, British Patent Nos. 1547811 and 1547812 propose an image pickup apparatus in which the original image is scanned by infrared rays so as to detect any dust and defect which may exist on the original. In these British Patents, a dichroic mirror for separating visible rays from infrared rays is disposed in the image pickup optical path so as to separate the light beam thereby effecting correction of the image signals. The solutions proposed by these Patents, however, are still unsatisfactory in that they cannot predict the size or extent of the dust and defect, so that the they cannot effect a high degree of correction.

It is true that IC memories of a high level of performance have become available commercially, by virtue of the progress in the field of semiconductor technology. However, the price of the image pickup device will become very high if such IC memories are used for storing image data of respective colors such as R(red) G(green), B(Blue) and IR(infrared) at a high level of resolution.

In addition, the image pickup apparatus of the kind described heretofore known do not have any function which would automatically discriminate any dust and defect and give signs indicative of the presence of such dust and defect. Hitherto, therefore, it has been necessary to visually check the original film before the image pickup operation.

Actually, however, it is extremely difficult to detect tiny dust and tiny defects which may exist on the original, and it is often experienced that the operator overlooks such tiny dust and defects so that he is aware of the presence of such dust or defect only after the reproduction of the image. In such a case, it is necessary to conduct the image pickup operation once more, after removing such dust and defects, resulting in a loss of time which is serious particularly when a long time is required for the image pickup operation.

The solutions proposed by the above mentioned British Patents employ a sensor for detecting dust and defect through scanning with infrared rays, in addition to the sensor which is used for the purpose of picking up the image. When any defect is detected, the portion of the image data corresponding to the position of such a defect is replaced by image data in the region around such a defect. If the positions of both sensors are not aligned with each other, therefore, the detected position of the defect is undesirably deviated from the actual position of the defect.

Another problem is that the size of the region in which the defect exists is reduced from the actual size during binary coding of the image signals.

A solution to this problem is proposed in British Patent No. 1547812 mentioned above. In this Patent, the detected defective region is magnified by an OR circuit and a shift register circuit both in the directions of main scanning and sub scanning.

In order to electrically increase the size of the detected defective region, it is necessary to employ a circuit of a considerably large scale. In addition, in the case of an image pickup apparatus in which main scanning and subscanning are conducted independently, the defective region cannot be detected perfectly unless the subscan is conducted.

The solutions proposed by the British Patents mentioned above suffer from another disadvantage in that there is no means of recording the positions of the defective picture elements so that it is impossible to judge what portion of the original image has been corrected.

It is to be noted also that tiny dust and elongated dust can hardly be removed though large dust can be removed without difficulty at time of the original. Elongated defects also are often observed but no effective measure has been proposed hitherto for removing such defects having an elongated pattern.

SUMMARY OF THE INVENTION

Accordingly, an object of the present invention is to provide an image data reading apparatus which is capable of eliminating the above-described problems of the prior art.

Another object of the present invention is to provide an image data reading apparatus which is capable of producing image reading data magnified or contracted with a high accuracy, as well as data concerning unevenness in the illumination intensity (referred to as "uneven lighting data" hereinafter) corresponding to the magnification or contraction scale thereby ensuring the high quality of the read image data even when there is unevenness in the illumination intensity of the light incident on the original.

Still another object of the present invention is to provide an image data reading apparatus which is capable of producing image reading data magnified or contracted with a high accuracy, as well as data concerning unevenness in the illumination intensity (referred to as "uneven lighting data" hereinafter) corresponding to the magnification or contraction scale, thereby ensuring the high quality of the read image data, despite any unevenness in the illumination intensity of the light incident on the original and any dust or defects in the original holder or in the optical systems.

A further object of the present invention is to provide a film image data reading apparatus which has means having a simple construction but yet capable of detecting dust and defects on the original film or optical members and correcting the video signal in accordance with the result of detection of such dust or defect.

A still further object of the present invention is to provide an image data reading apparatus which is capable of producing defect data concerning dust or defect on the original so as to make it possible to correct the output video image while reducing the capacity of memory required.

A still further object of the present invention is to provide an image data reading apparatus which is capable of discriminating any dust and defect on the original image and informing the user of the result of the detection.

A still further object of the present invention is to provide an image data reading apparatus in which an image forming optical system can operate with two different aperture characteristics, one for detection of defects and one for picking up the original image.

A still further object of the present invention is to provide an image data reading apparatus which is constructed to facilitate detection of any defect which may reside on the original image and to enable elongated defect pattern of the read data to be corrected efficiently.

These and other objects, features and advantages of the invention will become clear from the following description of the preferred embodiments when the same is read in conjunction with the accompanying drawings.

BRIEF DESCRIPTION OF THE DRAWINGS

FIG. 1 is a block diagram illustrating the basic arrangement of a first embodiment of the present invention;

FIGS. 2A and 2B are schematic illustrations showing the manners in which the read image data is affected by any dust and defect on the original or optical system;

FIG. 3 is a schematic illustration of a film scanner incorporated in the first embodiment of the invention;

DESCRIPTION OF THE PREFERRED EMBODIMENTS

Preferred embodiments of the present invention will be described hereinunder with reference to the accompanying drawings.

Referring first to FIG. 1 showing the basic arrangement of a first embodiment, there are shown a lighting optical system a, an infrared ray filter (IR filter) b which is used when a correction value is to be detected; an original document c, a projection optical system d, a photoelectric conversion element e, and a correction value detection means f. For the purpose of detection of the correction value, light is emitted several times from the lighting optical system a and is received by the photoelectric conversion element e through the IR filter b, original document c, and the projection optical system d. The output from the photoelectric conversion element e is delivered to the correction value detection means f which calculates the correction value based mainly upon the intensity distribution of the infrared light.

For reading the image on the original document c, the image processing means g effects on the output signal from the photoelectric conversion element e a shading correction in accordance with the correction value mentioned above.

Figure 2C:
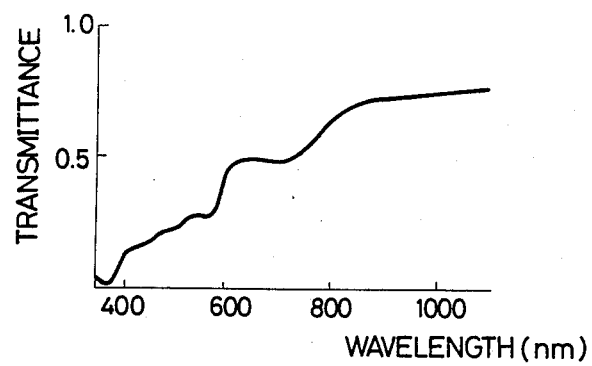
FIGS. 2C and 2D are diagrams showing spectral transmitting characteristics at the non exposed regions of a film.
Figure 2D:
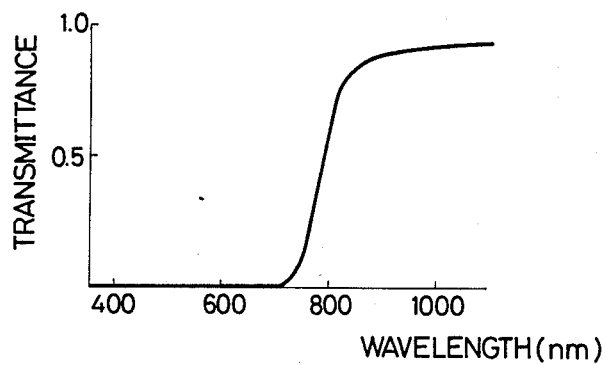

FIGS. 2C and 2D show spectral transmitting characteristics of typical negative and reversal films. More specifically, FIG. 2C shows the transmittance characteristics of unexposed negative film, while FIG. 2D shows the transmittance characteristics of unexposed reversal film. In these Figures, the abscissa represents wavelength, while the ordinate represents transmittance. From FIGS. 2C and 2D, it will be understood that both the negative and reversal films exhibit high levels of transmittance in the infrared region, e.g., region of wavelength above 800 nm. It has been confirmed through experiment also that the transmittance of the infrared region is not changed substantially and is maintained at high level regardless of the level of the transmittance in the wavelength region of visible rays (350 to 700 nm). Namely, in the infrared region above 800 nm, any unevenness in the illumination intensity of the light receiving surface be measured regardless of the film image data. In the first embodiment of the present invention, a shading correction which will be explained hereinunder is conducted by making use of this principle.

FIG. 3 is a schematic illustration of a first embodiment of the film scanner of the present invention.

Referring to this Figure, the film scanner has a lamp 1 for lighting an original film, a condenser lens 2 for collecting the light from the lamp 1, and a heat-insulating filter 3. The lamp 1, condenser lens 2 and the heat-insulating filter 3 in cooperation constitute a lighting optical system. A numeral 4 designates a filter changing mechanism which will be explained later with reference to FIG. 5. The film scanner further has a subscan system which, as will be explained later in connection with FIG. 4, scans the original film in the subscan direction from the upper side to the lower side and vice versa as viewed in FIG. 3 substantially perpendicularly to the optical axis. A projection lens 7, which has a zooming function with variable magnification, is adapted to form the image of light transmitted through the film original on the sensor 11.

A total reflection mirror 8 is rotatable about a pivot axis. When the object is being observed through a finder, the total reflection mirror 8 is in the optical path as shown by full line. On the other hand, during scanning on the film, the total reflection mirror 8 is driven by a known driving mechanism such as a rotary plunger so as to avert from the optical path, as shown by one-dot-and-dash line. A reference numeral 9 designates a print plate of the finder for the purpose of enabling the user to observe the film original. A light-measuring sensor 10 is patterned on a transparent glass substrate.

The sensor 11 is a self-scanning type line sensor such as, for example, a CCD. The sensor 11 is disposed in the direction perpendicular to the plane of this Figure at 90° offset from the direction of subscan performed by the subscan system 6 and perpendicular to the optical axis, i.e., in the direction of the main scanning. A numeral 12 denotes a light-quantity control mechanism such as a diaphragm mechanism or an ND filter adapted for controlling the lighting intensity of the light-receiving surface of the line sensor 11 in accordance with the light-measurement output from the light-measuring sensor 10. In the illustrated embodiment, the mechanism 12 is disposed at the position of the projection lens 7. The optical axis of the film scanner is represented by a line 1—1.

Figure 4:
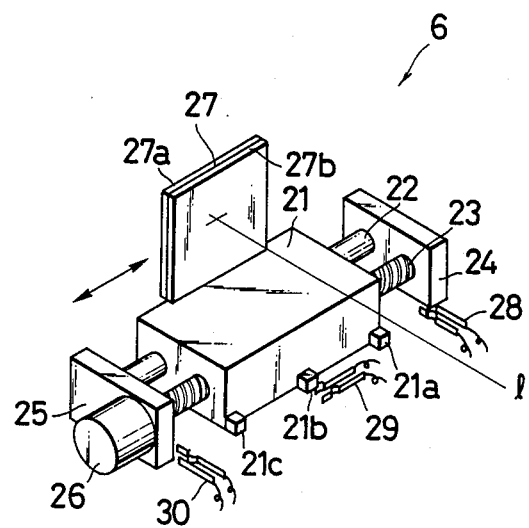
FIG. 4 is a perspective view of an example of a subscan system 6 in the film scanner shown in FIG. 3.

FIG. 4 shows the detail of the subscan system 6 shown in FIG. 3. The subscan system has a scanning section (carriage) 21 mounted for movement in the direction of arrows, i.e., in the direction of the subscan, a guide rail 22 for supporting the scanning section 21 for movement in the direction of the arrows, a feed screw 23 which is adapted to be rotated by a later-mentioned motor 26 so as to feed the scanning section 21, and supporting brackets 24 and 25 which support both ends of the rail 22 and the feed screw 23 on a base (not shown).

The above mentioned driving motor 26 rotates and drives the feed screw so as to feed the scanning section 21 back and forth in the directions of the arrows. The driving motor 26 is a stepper motor which operates in a stepped manner in accordance with the pitch of reading by the sensor 11. A film original holder 27 is fixed to the scanning section 21 so as to move as a unit with the scanning section 21. The holder 27 has a pair of glass sheets 27a and 27b which cooperate with each other in clamping a film original therebetween so as to keep the surface of the original flat. Any dust which may exist on the surface of the film original and/or the surfaces of the glass sheet can be regarded as being placed at positions which are materially equivalent to the light receiving surface of the sensor with respect to the projection lens. It is, therefore, conceivable that the image data is partially omitted due to the presence of the dust.

Numerals 28, 29 and 30 denote, respectively, itches for detecting the scanning section 21 at the starting position, mid position and the end position of the scanning stroke. These switches are adapted to be turned on and off by corresponding projections 21a, 21b and 21c provided on a lateral side of the scanning section 21 integrally therewith More specifically, when the first switch is in the on state, the scanning section 21 is in the starting end of the scanning stroke. Similarly, the second switch 29 and the third switch 28 are turned on, respectively, when the scanning section is in the mid position and end position in its scanning stroke. The detection of the central position by means of the switch 29 is used when the whole of the image plane is observed through a finder 9.

Figure 5:
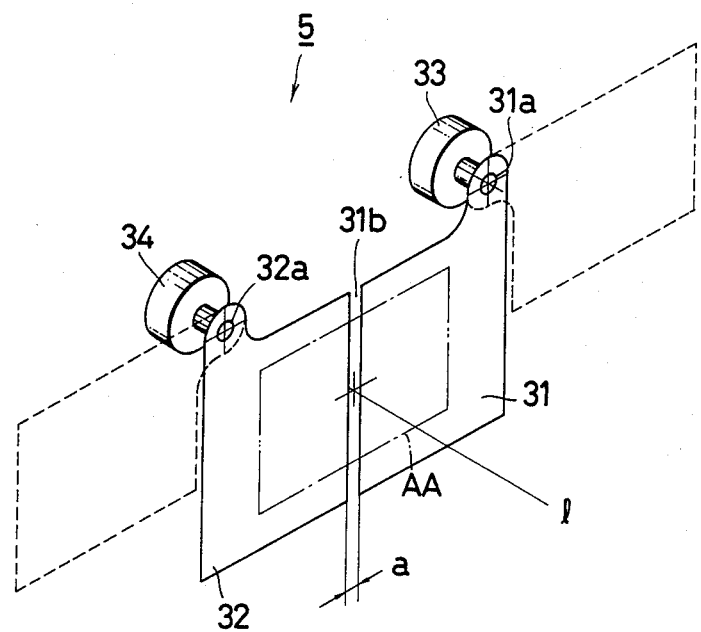
FIG. 5 is a perspective view of an example of a shutter mechanism 5 in the film scanner shown in FIG. 3.

FIG. 5 shows the detail of the shutter mechanism 5 shown in FIG. 3. Referring to this Figure, light-shielding plates 31 and 32 are rotatably carried by rotary shafts 31a for rotation about axes of these shafts. These light-shielding plates 31 and 32 are adapted to be rotationally driven by rotary plungers 33 and 34 through these rotary shafts 31a and 31b. In this Figure, two-dots and -dash lines AA shows the image area of the film original.

During observation through the finder, the light-shielding plates 31 and 32 have been driven outward by the rotary plungers 33 and 34 and stationed at open positions represented by broken lines. However, during reading of the data on the film original, the light-shielding plates 31 and 32 have been driven by the rotary plungers 33 and 34 so as to be placed at light-shielding positions shown by full lines. The light-shielding plates 31 and 32 in the light-shielding positions oppose each other leaving a slit 31b of a small width a therebetween so as to expose only the portion of the film original opposing to the light-receiving portion of the sensor 11. Thus, the remainder portions of the film original are shielded from the light by the light-shielding plates 31 and 32, thus minimizing any degradation of the quality of the image data which may be caused due to, for example, a ghost flare. As in the case of FIG. 3, the optical axis is represented by a line 1—1.

Figure 6:
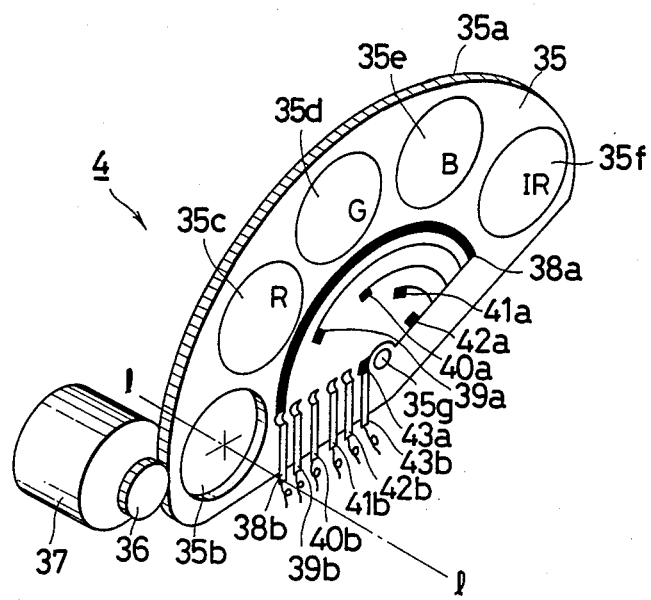
FIG. 6 is a perspective view of an example of a filter changing mechanism 4 in the film scanner shown in FIG. 3.

FIG. 6 shows the detail of the filter changing mechanism 4 in the film scanner shown in FIG. 3.

Referring to this Figure, the filter changing mechanism 4 has a filter holder 35 adapted for holding a color filter or the like which is to be placed in the optical path 1—1. The filter holder is rotatably carried by a shaft 35g. The filter holder 35 has a pass-through portion 35b for observation through finder, and color separation filters 35c, 35d and 35e of R (red), G (green) and B (blue colors), as well as an IR (infrared ray) filter 35f for the purpose of measurement of shading correction value and for the purpose of detection of dust and defect which may exist on the film original and/or the optical systems.

The filter holder 35 as a whole has the form of sector gear with gear teeth 35a on the peripheral surface thereof. As the motor 37 operates, the filter holder 35 is rotated through the operation of a motor pinion 36 which meshes with the gear teeth 35a, so that one of the pass-through portion 35b, R, G, B and IR filter portions 35c, 35d, 35e and 35f is brought into the optical path represented by the line 1—1. Pattern electrodes 38a, 39a, 40a, 41a, 42a and 43a for the purpose of detection of the filter placed in the optical path 1—1 are provided on a lateral side surface of the filter holder 35. Namely, the electrode 43a is located at a position corresponding to the position of the pass-through portion 35b. The electrode 39a is located at a position corresponding to the position of the R filter 35c. The electrode 40a is located at a position corresponding to the position of the G filter 35d. The electrode 41a is located at a position corresponding to the position of the B filter 35e. Finally, the electrode 42a is located at a position corresponding to the position of the IR filter 35f. These pattern electrodes are adapted to conduct electricity.

The filter changing mechanism also has brushes 38b, 39b, 40b, 41b, 42b and 43b corresponding to the electrodes 38a, 39a, 40a, 41a, 42a and 43a. Assuming here that the brush 38b which is always in contact with the electrode 38a is at the ground level, the brush 43b assumes the low level when the corresponding portion, i.e., the pass-through portion 35b is in the optical path. When the R filter 35c is in the optical path, the brush 39b assumes the low level. When the G filter 35d is in the optical path, the brush 40b assumes the low level. When the B filter 35d is in the optical path, the brush 41b assumes the low level. Finally, when the IR filter 35f is in the optical path, the brush 42b assumes the low level. The optical path is represented by line 1—1 as in the case of FIG. 3.

Figure 7:
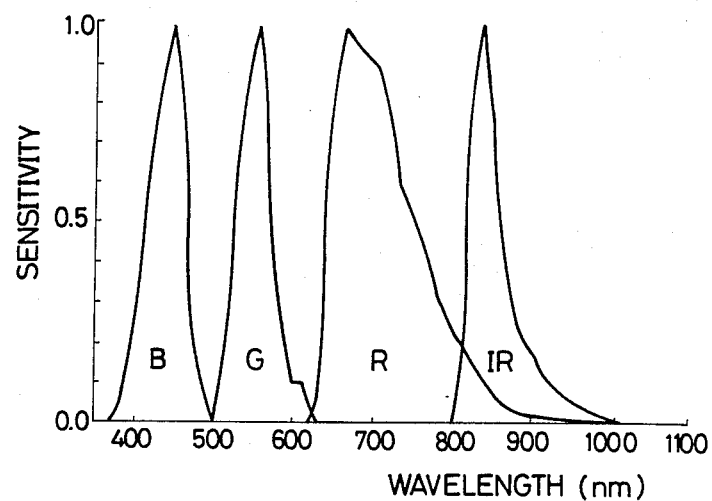
FIG. 7 is a chart illustrating the spectral sensitivity characteristics of R, G, B and IR filters.

FIG. 7 shows overall spectral sensitivity of the linear sensor 11 to the spectrum obtained through the filters 35c, 35d, 35e and 35f of the R, G, B and IR filters on the filter holder 35. In this Figure, the abscissa represents the wavelength, while the ordinate represents the sensitivity. As will be seen from this Figure, when the IR filter 35f is being used, the linear sensor 11 conducts photoelectric conversion particularly in the infrared wavelength region above 800 nm.

Figure 8:
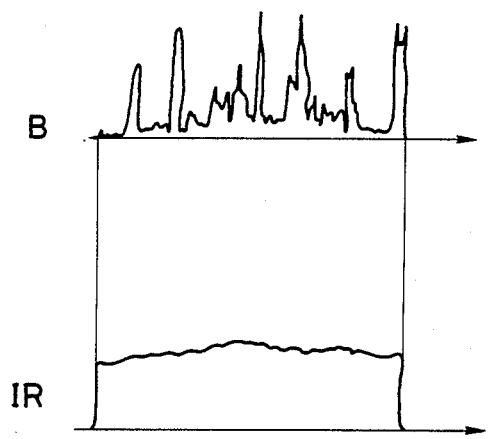
FIG. 8 is a waveform chart showing the waveforms of outputs from the sensor 11 obtained through a visible ray filter and an IR filter.

Referring to FIG. 8, a symbol B shows the output of the linear sensor 11 as obtained from a portion of the film through a visible ray filter, e.g., B filter 35e, while IR represents the output as obtained through the IR filter 35f from the same position of the film. In the output B, a difference in the thickness of the image on the pass-through color film is reproduced as a distinctive difference in the level of the output from the sensor 11. On the other hand, the output IR of the sensor 11 obtained through the IR filter 35f takes a substantially constant level regardless of the difference in the level of output B obtained through the B filter 35e. Thus, unevenness in the level of the output IR is considered to be attributable to uneven lighting. It is thus possible to measure any uneven lighting on the light receiving surface of the sensor 11 through measuring the output of the sensor 11 obtained with the IR filter 35f. It is to be noted, however, the level of the output IR is locally lowered at portions corresponding to positions of any dust attaching to the optical system or defect in the film.

Figure 9:
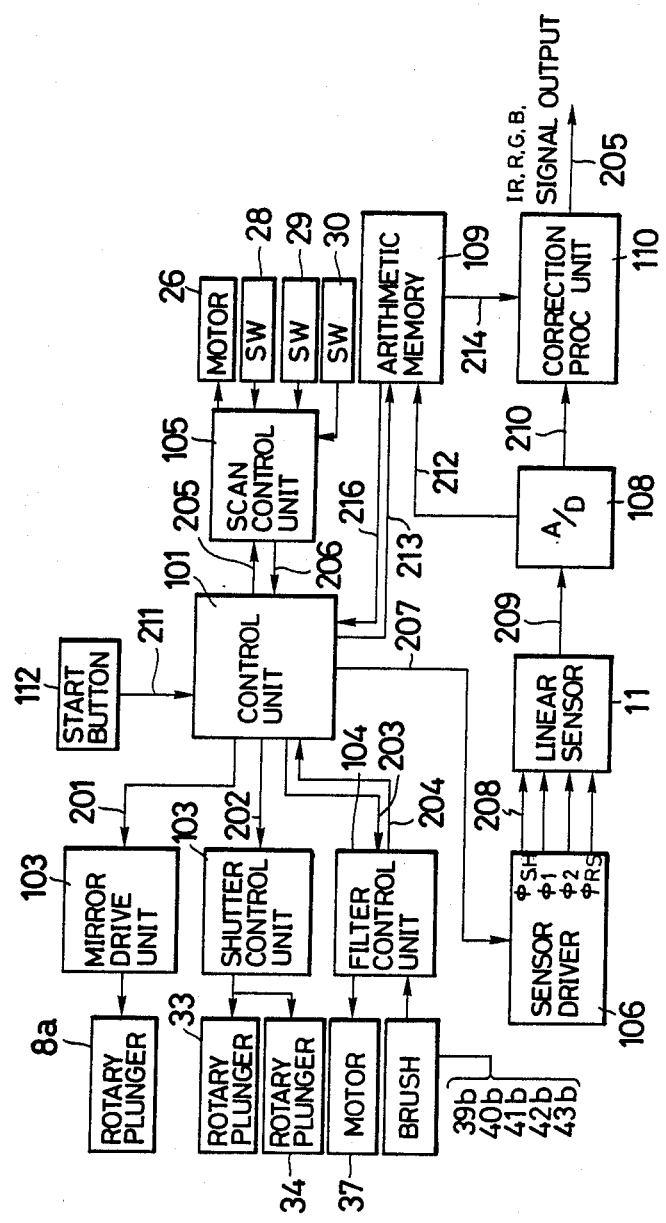
FIG. 9 is a block diagram showing the circuit arrangement of the color scanner shown in FIG. 3.
Figure 10:
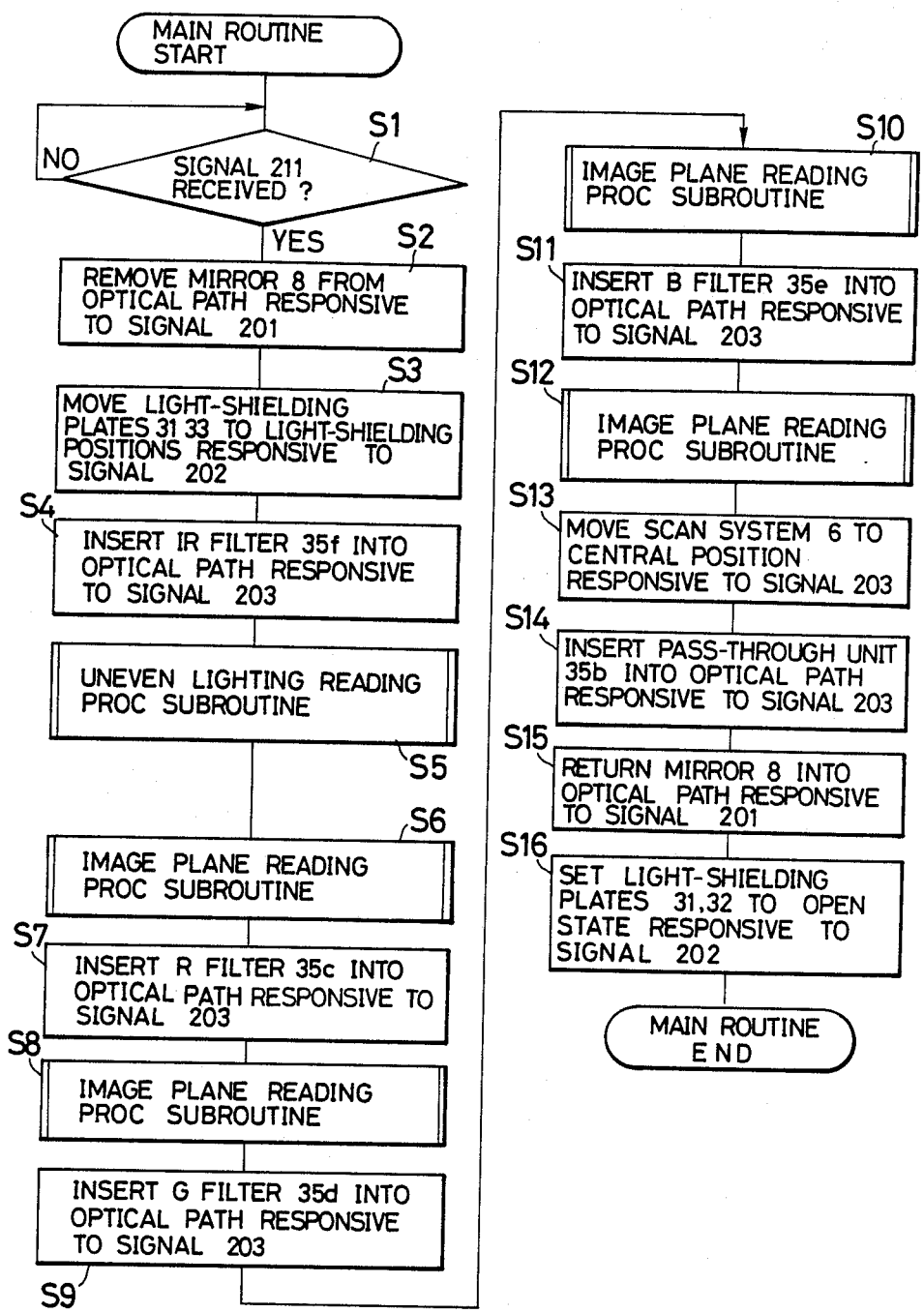
FIGS. 10, 11, 12 and 13 are flow charts showing the flow of control performed by a control section 101.
Figure 11:
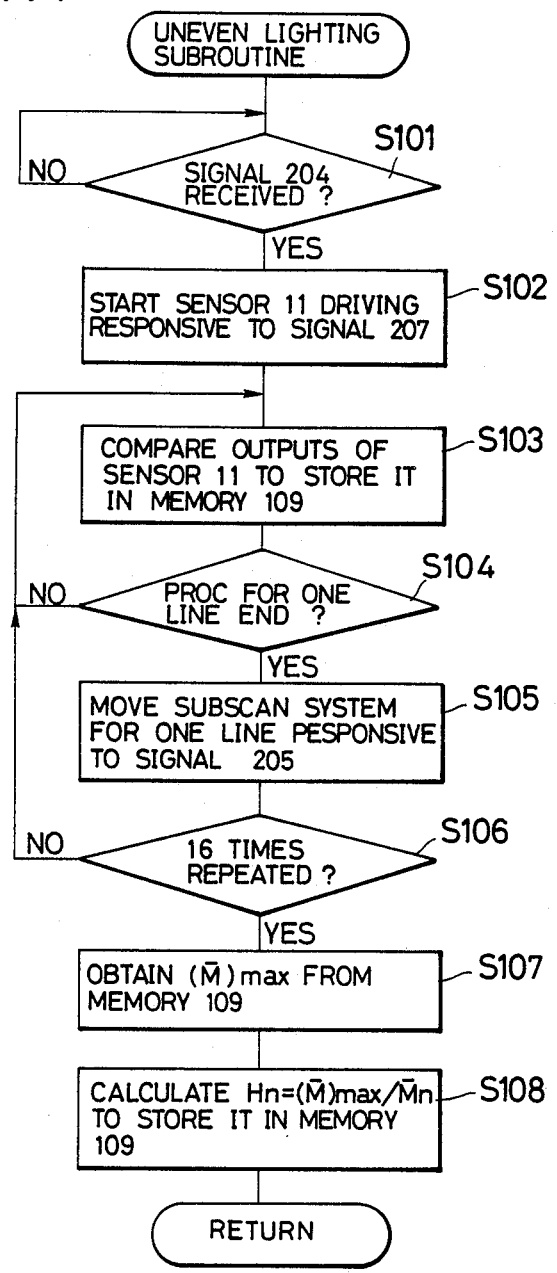
Figure 12:
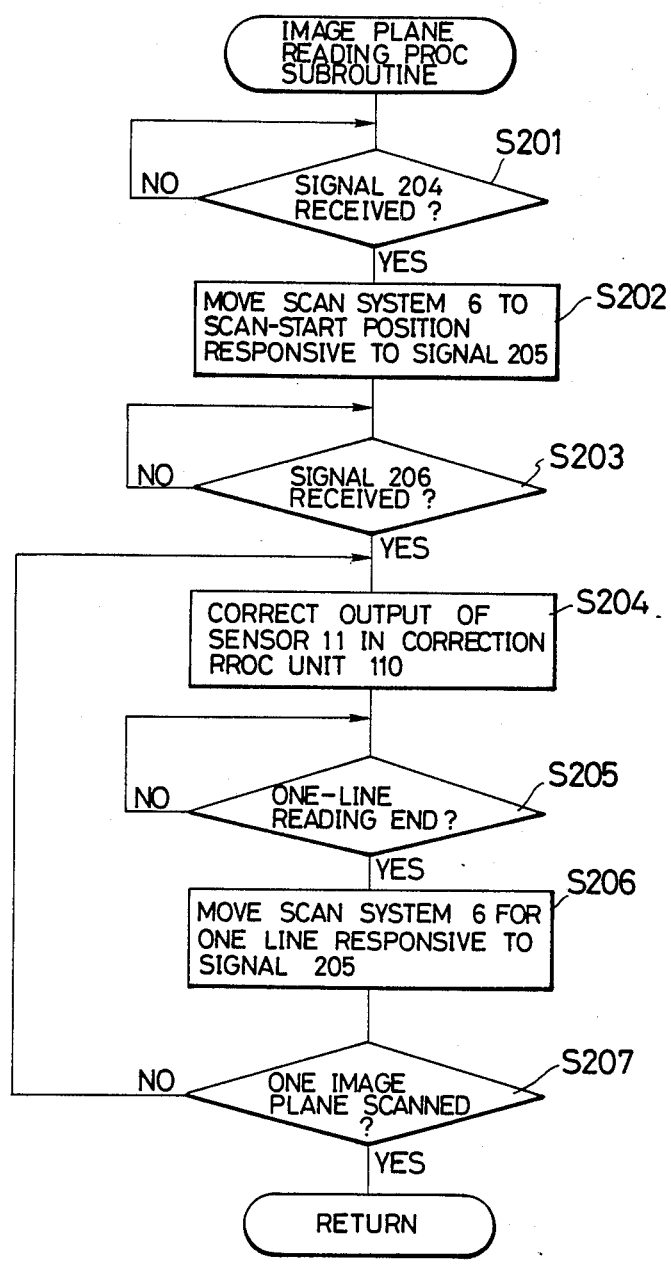

FIG. 9 shows the circuit arrangement of a film scanner shown in FIG. 3 incorporated in the apparatus of the present invention. The film scanner has a control unit 101 adapted for controlling motors and sensors in accordance with the control sequence as shown in FIGS. 10 to 12. The film scanner further has a mirror drive unit 102 for driving and controlling a rotary plunger 8a for opening and closing the mirror 8, a shutter control unit 103 for driving and controlling rotary plungers 33, 34 of the shutter mechanism 5, a filter control unit 104 for driving and controlling the motor 37 of the filter changing mechanism 4, and a scan control unit 105 for driving and controlling the motor 26 of the subscan system 6. A reference numeral 106 designates a sensor driver for driving and controlling the linear sensor 11. A reference numeral 108 denotes an A/D (analog to-digital) converter for successively converting analog output of the self-scan type linear sensor 11 such as a CCD into digital signals.

A numeral 109 designates an arithmetic memory which is adapted to compute, in a manner which will be explained later, the correction value for the shading correction from the uneven lighting data measured by the linear sensor 11 with the IR filter 35f placed in the optical path, and to store the thus calculated correction value. A reference numeral 110 designates a correction processing unit which is adapted to effect a shading correction on the video output from the A/D converter 108 in accordance with the correction value stored in the memory 109.

The operation of this embodiment will be explained in more detail with reference to flow charts which are shown in FIGS. 10, 11 and 12.

When the film original is observed by eyes through a finder, the mirror 8 is positioned in the optical path 1—1, while the center of the film original holder 27 of the subscan system 6 is on the mid point of the optical path. Meanwhile, the light shielding plates 31 and 32 of the shutter mechanism 5 are in the open state, so that the pass through portion 35b of the filter changing mechanism 4 is placed in the optical path. The user confirms the state of the film original through checking the image formed on the print plate 9 of the finder.

Then, as the start button 112 is pressed, a scan-start signal 211 is generated in Step S1, so that the control unit 101 delivers a mirror driving signal 201 to the mirror driving unit 102 so as to retract the mirror 8 from the optical path by the operation of the rotary plunger 8a (Step S2). Subsequently, a shutter driving signal 202 is delivered to the shutter control unit 103 so as to activate the pair of rotary plungers 33, 34 thereby moving the light-shielding plates 31, 32 of the shutter mechanism 5 to the light-shielding positions, thus eliminating any ghost flare, in Step S3.

Simultaneously, the control unit 101 delivers a filter control signal 203 to the filter control unit 104, so as to selectively insert the color separation filter into the optical path.

In Step S4, the filter control unit 104 drives the motor 37 in response to the filter control signal 203 until the IR filter is placed in the optical path, i.e., until the brush 42b is changed to a low level.

When the brush 42b assumes the low level, the filter unit 104 delivers to the control unit 101 a filter change completion signal 204 which represents the completion of the filter changing operation. Then, a subroutine shown in FIG. 11 is executed in Step S5. Upon receipt of the filter change completion signal 204 in Step S101, the control unit 101 delivers a read start signal 207 to a sensor driver 106, so that the sensor driver 106 starts to drive the sensor 11 in response to this signal 204 in Step S102. Then, the output signal (video signal) 209 from the sensor 11 is successively converted into digital signals which are then sent to and stored in the arithmetic memory 109 in Step S103. In Step S104, the sensor 11 finishes the reading of one line after outputting pieces of signal 209 of a number corresponding to the predetermined picture element.

In Step S105, the control unit 101 generates a scanning control signal 205 and delivers the same to the scan control unit 105. Upon receipt of the scanning signal 205, the scan control unit 105 drives the pulse motor 26 by a predetermined number of pulses thus completing subscan over one line.

The process then returns to Step S3 in which the sensor 11 is driven to read data of one line and stores the same successively in the memory 109 as described before. The memory 109 then compares the thus stored data with the levels of the corresponding picture element outputs of the shading data which have been beforehand stored in the memory 109, and stores the greater ones as new shading data $\overline{M}n$.

The operation of Steps S103 to S105 are repeated by a predetermined number of cycles, e.g., 16 cycles, thus completing the reading of the shading data in Step S106.

It will be seen that omission of video data due to presence of dust or defect can be avoided because the greater ones of the read data obtained in the successive operation cycles are stored as the new shading data.

Then, in Step S107, the maximum value $(\overline{M})max$ of the shading data of the respective picture elements and in Step S108, the ratio of the uneven lighting data $\overline{M}n$ of each picture element to the maximum value $(\overline{M})max$ of the uneven lighting data $\overline{M}n$ is calculated in accordance with the following formula (1), so as to determine the correction value Hn for each picture element and to store the same.

$$Hn = (\overline{M})max/\overline{M}n \qquad (1)$$

where, Hn represents the correction value for the n-th picture elements, $(\overline{M})max$ represents the maximum value of the uneven lighting data and $\overline{M}n$ represents the uneven lighting data of the n-th picture element.

Then, the process proceeds to Step S6 to start a subroutine as shown in FIG. 12. Upon receipt of the filter change completion signal 204 in Step S201, the control unit 101 transmits a scan-start signal 205 to the scan control unit 105. Upon receipt of the scan start signal 205, the scan control unit 105 drives in Step S202 the stepper motor 26 to bring the carriage of the subscan system 6 to the scan start position, i.e., until the switch 30 is turned on. As the switch 30 is turned on, the scan control unit 105 judges that the scanning is finished, and sends a scan-completion signal 206 back to the control unit 101, whereby the preparation for the scan over the film original is completed.

In step S203, the control unit 101 which has received the scan-completion signal delivers a read-start signal 207 to the sensor driver 106 so that the driver 106 drives the sensor 11 in response to the read-start signal 207. Then, the output signal (video signal) 209 from the sensor 11 is successively converted into a digital signal by the A/D converter 108, and is successively input to the correction processing unit 110. In response to the output signals from the A/D converter 108, the processing unit 110 reads the corresponding correction values Hn stored in the memory 109 and multiplies the output of the A/D converter with the respective correction values Hn, the results of which are delivered successively to the outside as the read video data (Step S204).

The sensor 11 finishes one line reading after delivering a predetermined number of pieces of output signal 209, the number corresponding to the number of picture elements. Simultaneously with the completion of one line reading, in Step S205, the control unit 101 delivers a scan control signal 205 to the scan control unit 105, so that the scan control section 105 drives pulse motor 26 by a predetermined number of pitches in response to the signal 205, so that one-line scan of the subscan system is completed in Step S206.

Then, the process returns to Step S204 so that the sensor 107 is driven so as to read one line video signal (IR signal). The reading processing operation from Step S204 to Step S206 is repeated in Step S207 for a predetermined number of cycles corresponding to one frame, thus completing the reading of the IR video data The process then returns to the main routine and the subsequent operation is commenced with Step S7. The control unit 101 then delivers a filter control signal 203 so as to activate the filter control unit 104, thus driving the motor 37 until the R filter 35c is positioned on the optical path 1—1, i.e., until the potential of the brush 39b comes down to the low level.

After the R filter 35c has been selected, the process proceeds to Step S8 so that the same processing cycles similar to the IR video reading process explained above (Steps S201 to S208 shown in FIG. 12) are repeated so that R video data is read.

The same process is repeated so as to read G video data and B video data from the linear sensor 11 in Steps S9, S10, S11 and S12, thus completing reading of all the necessary data from one frame of the film original.

After the completion of reading of the data from one frame, the control unit 101 delivers a scan control signal 205 to the scan control unit 105, thereby driving the motor 26 so as to bring the subscan system 6 to a mid position of the subscan (Step S13). After the completion of the driving of the subscan system 6, i.e., after the switch 29 is turned on, a filter control signal 203 is delivered through the filter control unit 104 so as to drive the motor 37, thereby bringing the pass-through portion 35b of the filter into the optical path (Step S14). Meanwhile, the mirror drive unit 102 is activated by a mirror driving signal 201, thereby moving the mirror 8 back into the optical path (Step S15). At the same time, the shutter control unit 103 is activated in response to a shutter drive signal 202 so as to drive the rotary plungers 33, 34, thereby opening the light-shielding plates 31 and 32 (Step S16), thus completing a series of processes for reading and processing the video data from one frame of the film original.

In the embodiment described hereinbefore, the shading data is measured with infrared rays, and the correction values are determined on the basis of the shading data. This, however, is not exclusive and the same effect is obtainable by measuring the shading data through a pass through portion which is devoid of the original. An equivalent effect can be obtained also by forming the shading data from a portion of the IR data.

As has been described, the first embodiment of the invention is adapted for measuring the shading data for a plurality of cycles and the maximum one of the values obtained for each picture element through the plurality of measuring cycles is used as the shading data which is used as the base for the determination of the correction value. The described embodiment, therefore, offers the following advantages.

(1) Correction is possible also for eliminating temporal change in the lighting system, particularly the illumination lamp.
(2) It is possible to obtain a correct shading data regardless of the presence of dust in the shading data.
(3) It is possible to compensate for any fluctuation or lack of uniformity of sensitivity of the picture elements of the image sensor.
(4) Correction can be effected accurately when the state of unevenness of the lighting is changed.
(5) It is possible to measure the state of uneven lighting even when the original is placed in the optical path, particularly when the shading data is measured by the described process with infrared rays.

The first embodiment described hereinbefore makes use of the specific spectral transmitting characteristics obtained in infrared wavelength region, such that the shading data is measured with infrared rays and the thus measured shading data is used as the base for the calculation of correction values by which the read video data is corrected. In consequence, the following remarkable advantages are offered by this embodiment.

(1) It is possible to effect an accurate correction even when a change is caused in the state of uneven lighting by a change in the magnification or trimming.
(2) It is possible to measure the state of uneven lighting even when the film original is placed in the optical path.
(3) It is possible to compensate for any influence which may be caused by fluctuation of the sensitivity levels of all the picture elements in the image sensor.
(4) It is possible to effect a correction even for a temporal change in the characteristics of the lighting system, particularly of the illuminating lamp.

Figure 13:
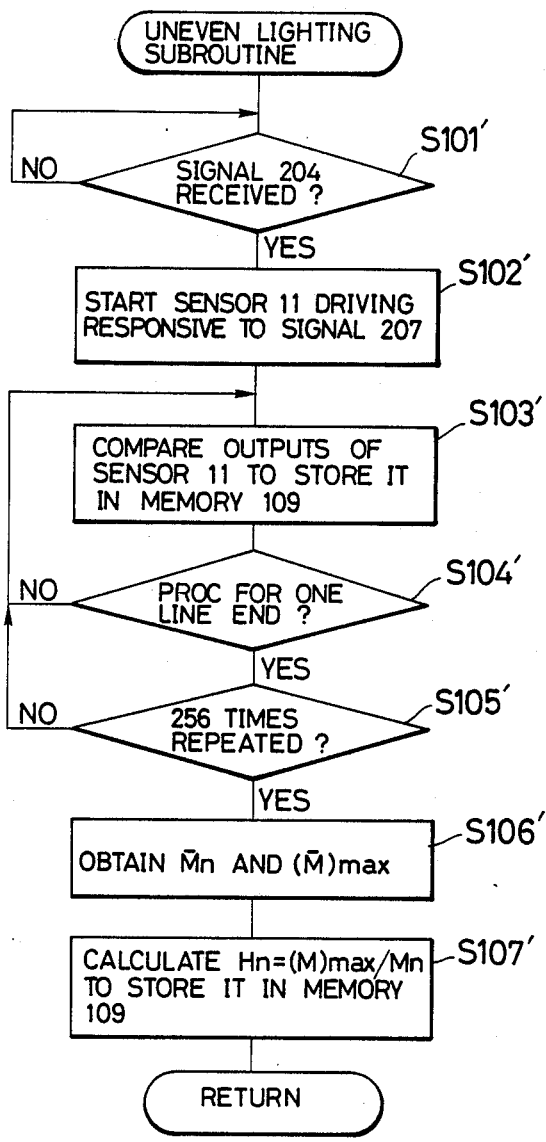

FIG. 13 shows another example of the subroutine which is executed in Step S5 of the process shown in FIG. 10.

In this subroutine, the control unit 101 receives the filter change completion signal 204 in Step S101', and delivers a read-start signal 307 to the sensor driver 106 which in turn starts to drive the sensor 11 in response to the read start signal 207 in Step S102'. The output signals (video signal) 209 from the sensor 11 are successively converted into digital signals by the A/D converter 108 and the thus obtained digital video signals are sent to and stored in the arithmetic memory 109 in Step S103'. After outputting pieces of output signals 209 of a number corresponding to the predetermined number of the picture elements, the sensor 11 finishes one-line reading in Step S104'.

This reading and storage operation is repeated for a predetermined number of cycles, e.g., 256 cycles, and the output data of the A/D converter 108 obtained in successive cycles are stored in the arithmetic memory 109 in Step S105'. Thereafter, the mean value of the data obtained through 256 measuring cycles and stored in the memory 109 is calculated for each picture element. The thus obtained mean value of the data is used as the uneven lighting data $\overline{M}n$ of each picture element. At the same time, the maximum value $(\overline{M})$max of the uneven lighting data $\overline{M}n$ is determined in Step S106'.

Then, a computation is executed in accordance with the formula (1) mentioned before to calculate the ratio of the uneven lighting data $\overline{M}n$ of each picture element to the maximum value $(\overline{M})$max of the uneven lighting data of all the picture elements, thus determining the correction value Hn for each picture elements and storing the same in the memory in Step S107.

A second embodiment of the present invention will be described hereinunder.

Figure 14:
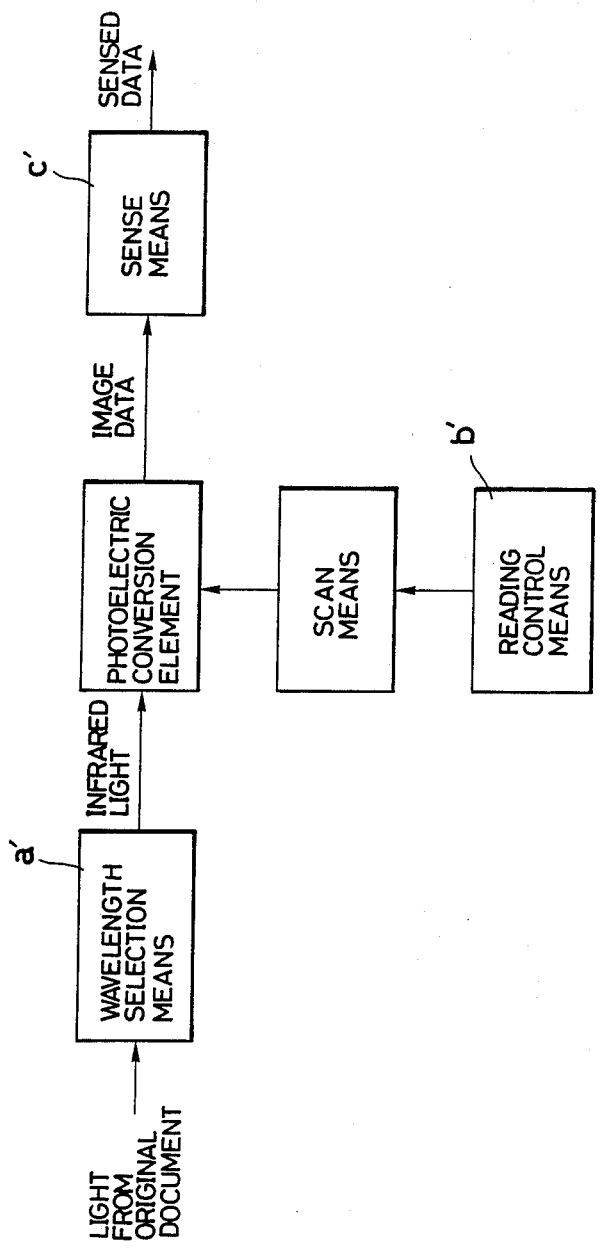
FIG. 14 is a block diagram showing the basic arrangement of a second embodiment of the present invention.

FIG. 14 shows the basic arrangement of the second embodiment. Referring to this Figure, a wavelength selection means a' is disposed such as to be inserted as desired into the optical axis of the lighting optical system or the projection optical system. A reading control means b' is adapted for continuously driving the scan means so as to read the image data from the film original through the photoelectric conversion element when the wavelength selection means is placed in the optical axis. A sense means c' is adapted to sense the position of any dust or defect on the film original on the basis of the video data which is read during the continuous operation of the scan means.

The second embodiment also employs a subscan system of the film scanner, shutter mechanism and a filter changing mechanism which are the same as those used in the first embodiment and, hence, are not detailed here. In the explanation of this second embodiment, the same reference numerals are used to denote the same parts or members as those used in the first embodiment.

Figure 15:
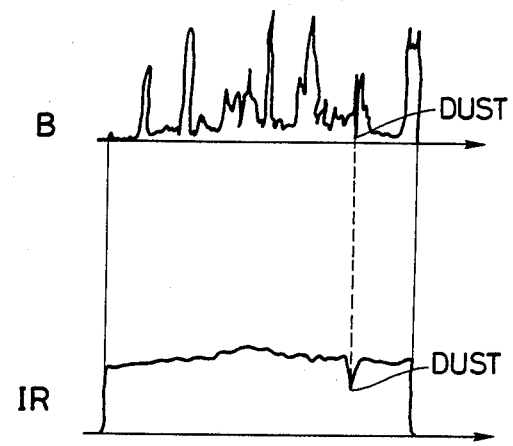
FIG. 15 is a waveform chart showing the waveforms of outputs from the sensor 11 obtained through a visible ray filter and an IR filter.

Referring to FIG. 15, curves B and IR represent, respectively, examples of line outputs of the linear sensor 11 as obtained through a visible ray filter, e.g., B filter 35e, and the IR filter 35f from the same portion of the film. It will be seen that difference in thickness of the image on the transparent color film original is distinctively reproduced as a difference in the level of the output B. In the output B, however, it is difficult to discriminate omission (indicated by an arrow) of the video signal due to the presence of dust on the film from the changes of output level caused by difference in the thickness of the original image.

In contrast, the sensor output IR obtained through the IR filter 35f has a substantially constant level regardless of the change in the level of the output B obtained through the B filter 35e. It is, therefore, possible to sense the position of the dust by slicing the sensor output IR (IR video data) obtained through the IR filter at a suitable slice level.

During the reading of the IR video data, the stepper motor 26 of the subscan system 6 shown in FIG. 4 is continuously driven so that the IR video data is read as an image which flows in the direction of the subscan.

Figure 16:
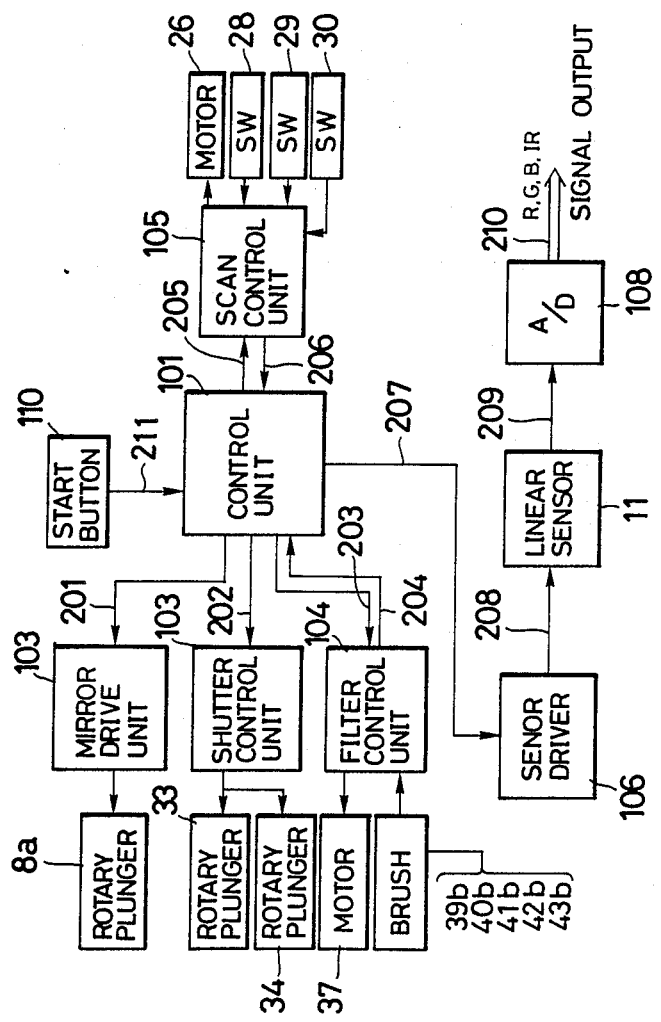
FIG. 16 is a block diagram of the circuit arrangement of a second example of the reading section of a color film scanner.

FIG. 16 shows the circuit arrangement of the film scanner incorporated in the second embodiment. Referring to this Figure, a control unit 101 is adapted to control motors and sensors in accordance with the process which will be explained later with reference to FIGS. 17 to 19. The film scanner further has a mirror drive unit 102 which drives and controls the rotary plunger 8a for opening and closing the mirror 8, a shutter control unit 103 for driving and controlling the rotary plungers 33, 34 of the shutter mechanism 5, a filter control unit 104 for driving and controlling the motor 37 of the filter changing mechanism 4, and a scan control unit 105 for driving and controlling the motor 26 of the subscan system 6. A numeral 106 designates a sensor driver for driving and controlling the linear sensor 11, while a numeral 108 designates an A/D converter for successively converting the analog outputs from the self-scan type linear sensor 11 such as a CCD into corresponding digital signals.

The details of the operation of the second embodiment will be explained hereinunder with reference to flow charts shown in FIGS. 17, 18 and 19.

When the film original is observed by eyes through the finder, the mirror 8 is in the optical path 1—1 while the center of the film original holder 27 is in the center of the optical axis. The light-shielding paths 31 and 32 of the shutter mechanism 5 are opened. In addition, the pass-through portion 35b of the filter changing mechanism 4 is placed in the optical axis. In this state, the user or operator confirms the state of the image on the film original through the print plate 9 of the finder.

As a start button 110 is pressed, a scan-start signal 211 is generated in Step S1001, so that the control unit 101 delivers a mirror drive signal 201 to the mirror drive unit 102 thereby activating the rotary plunger 8a so as to retract the mirror 8 from the optical path (Step S1002). Subsequently, the control unit 101 delivers a shutter drive signal 202 to the shutter control unit 103, thereby activating the pair of rotary plungers 33, 34 so as to drive the light-shielding plates 31, 32 of the shutter mechanism 5, thereby shielding the sensor from harmful light such as ghost flare (Step S1003).

At the same time, the control unit 101 delivers a filter control signal 203 to the filter control unit 104, so as to insert a color separation filter into the optical axis. Assuming here that the video data is read in a sequence represented by R, G, B and IR, the filter control unit 104 first places the R filter 35c in the optical axis in response to the filter control signal 203, by driving the motor 37 until this filter 35c is positioned in the optical axis, i.e., until the potential of the brush 39b is reduced to the low level (Step S1004).

After the potential of the brush 39b is reduced to the low level, the filter control unit 104 sends to the control unit 101 a filter change completion signal 204 which represents that the change of the filter has been finished.

Figure 18:
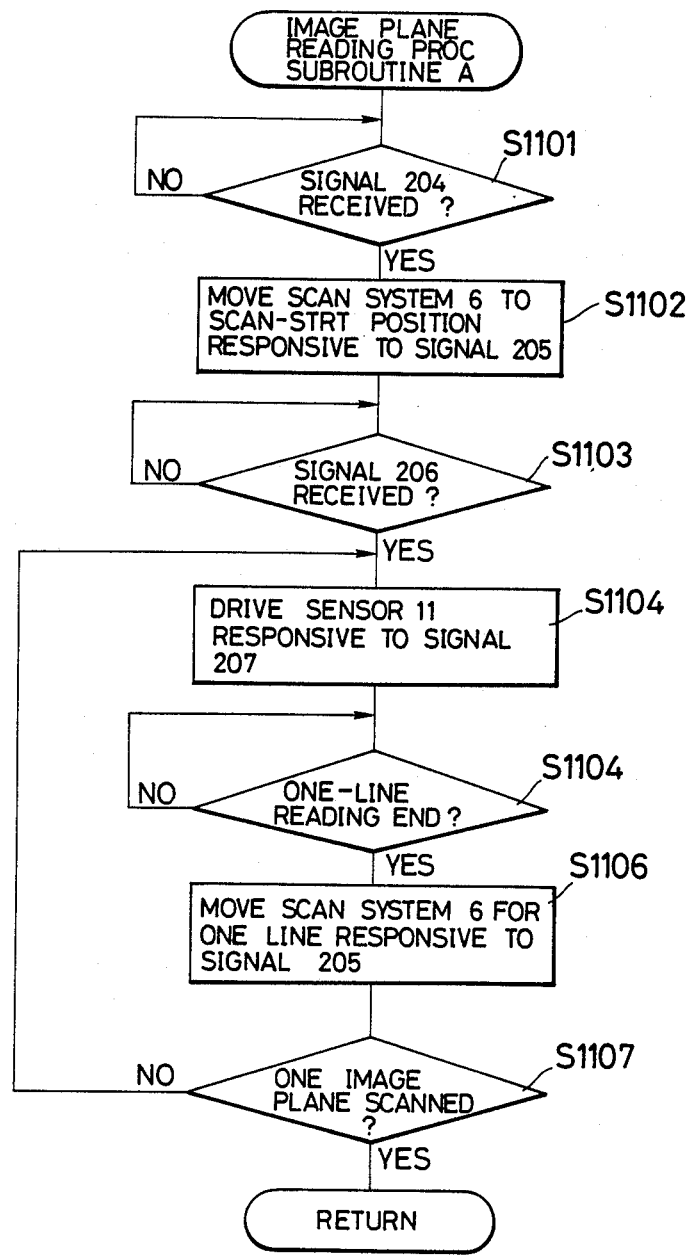

Then, the process proceeds to Step S1005 in which a subroutine as shown in FIG. 18 is conducted. In this subroutine, the control unit 101 delivers a scan-start signal 205 to the scan control unit 105 upon receipt the filter change completion signal in Step S1101. In response to the scan start signal 205, the scan control unit 105 drives the stepper motor 26 until the carriage of the subscan system 6 is brought to the scan-start position, i.e., until the switch 30 is turned on (Step S1102). As the switch 30 is turned on, the scan control unit 105 judges that the scan has been finished and sends a scan completion signal back to the control unit 101, whereby the preparation for the scanning of the film original is completed.

Upon receipt of the scan completion signal 206 in Step S1103, the control unit 101 delivers a read start signal 207 to the sensor driver 106, so that the driver 106 drives the sensor 11 in response to the read start signal 207 in Step S1104. The output signal (video signal) 209 from the sensor 11 is successively converted into digital signals by the A/D converter 108 and sent to an image processing circuit which is not shown. After outputting pieces of the output signal 209 corresponding to the predetermined number of the picture elements, the sensor 11 completes one-line reading.

As the one line reading is finished in Step S1105, the control unit 101 delivers a scan control signal 205 to the scan control unit 105, so that the scan control unit 105 drives the pulse motor 26 in response to the scan control signal 205 by an amount corresponding to a predetermined number of pitches, thus completing the one line subscan by the subscan system 6 (Step S1106).

Thereafter, the process returns to Step S1104 in which the sensor 11 is driven in the same manner as that described above, so that one-line video signal (R signal) obtained through R filter is read. The series of operations starting with Step S1104 and ending in Step S1106 is repeated by a predetermined number of cycles corresponding to one frame of the original, thus completing the reading of the R video data in Step S1107.

The process then returns to the main routine. Step S1006, the control unit 101 activates the filter control unit 104 in accordance with the filter control signal 203 for the purpose of changing the filter. In consequence, the motor 37 is driven until the G filter 35d is placed in the optical axis 1—1, i.e., until the potential of the brush 40b is reduced to the low level.

After the G filter 35d is selected in this manner, the process proceeds to step S1007 in which the same processing cycle as that explained in connection with the R video data (Steps S1101 to S1107 in FIG. 18) is conducted repeatedly, thus reading the G video data.

The B video data also is read from the linear sensor 11 in Steps S1008 and S1009 in accordance with the same procedure.

After the completion of reading of the B video data, the control unit 101 operates to change the filter, i.e., to insert the IR filter into the optical axis while withdrawing the B filter from the optical axis in Step S1010.

Figure 19:
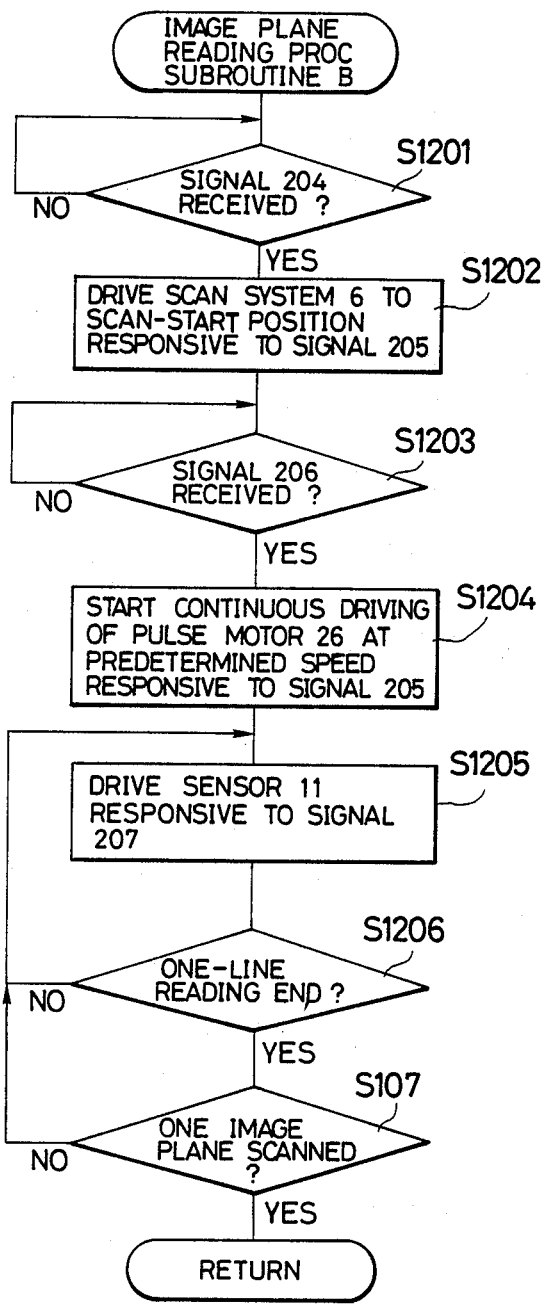

In a subroutine shown in FIG. 19, the control unit 101 operates to return the subscan system 6 back to the scan-start position in Steps S1201 to S1203, and produces a scan signal 205 and delivers the same to the scan control unit 105 thereby continuously driving the pulse motor 26 through the scan control unit 105 at a constant speed (Step S1204). Simultaneously, the sensor driver 106 is driven to cause the line sensor 11 to read video signals for each of successive lines at a predetermined time interval (Steps S1205, S1206).

This operation is repeated for a predetermined number of cycles corresponding to one frame (Step S1207), thus completing the reading of the IR video data.

Figure 17:
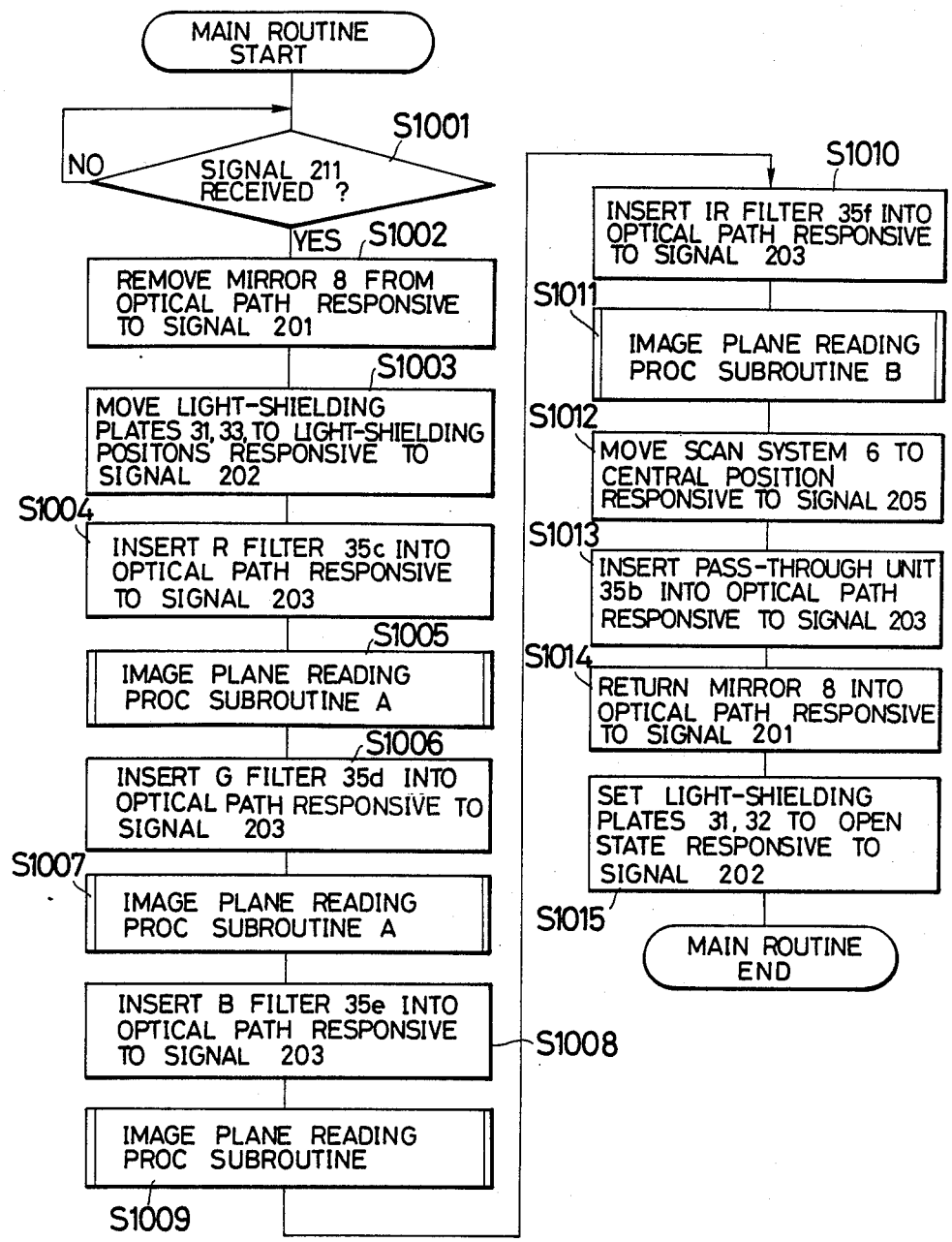
FIGS. 17 to 19 are flow charts illustrating the procedure of control performed by the control section 101 incorporated in the color film scanner shown in FIG. 16.

After the completion of the video data from one frame, the process returns to the main routine shown in FIG. 17, so that the control unit 101 delivers a scan control unit 105 by delivering to the same a scan control signal 205, thereby activating the motor 26 so as to position the subscan system 6 at the mid point of the subscan (Step S1012). After completion of the driving of the subscan system 6, i.e., after the switch 29 is turned on, the control unit 101 sends a filter control signal 203 to the filter control unit 104 thereby activating the motor 37 so as to insert the pass-through portion 35b of the filter changing mechanism into the optical axis (Step S1013). Then, the control unit 101 delivers a mirror driving signal 201 to the mirror drive unit 102 so as to return the mirror 8 into the optical axis in Step S1014. At the same time, a shutter driving signal 202 is fed to the shutter control unit 103 so that the rotary plungers 33, 34 are activated to open the light-shielding plates 31, 32 (Step S1015), whereby a series of operation for reading and processing the image data on the film original is completed.

A description will be provided hereinunder as to the process for sensing any dust or defect attaching to or residing in the optical system and/or the film original, as well as the process for correcting the video signals in accordance with the result of sensing of the dust or defect.

Figure 20:
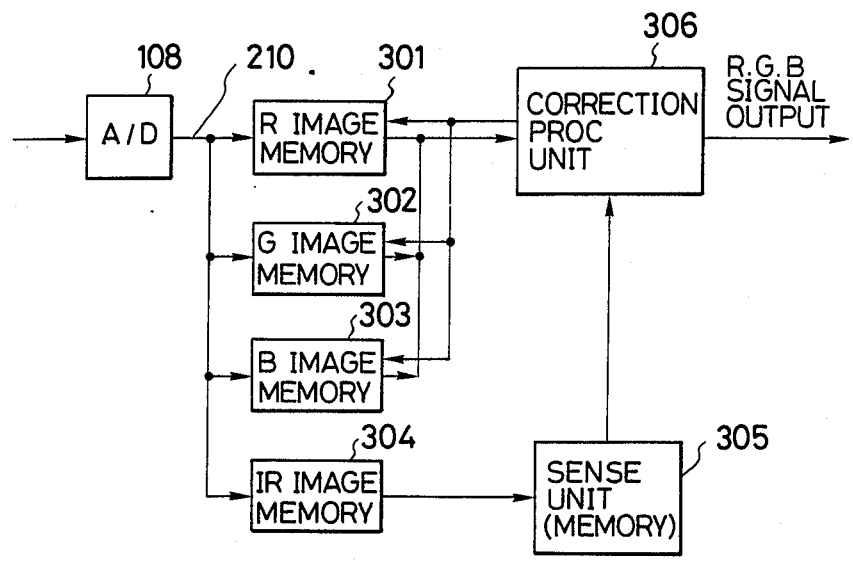
FIG. 20 is a block diagram of an example of a sensing/correction section incorporated in the apparatus of the present invention.

FIG. 20 schematically shows the construction of the video signal correction processing section which conducts the sensing of the dust or defect, as well as the processing for correcting the video signals. This section has image memories 301, 302, 303 and 304 which receive, through the A/D converter 108, the R, G, B and IR video data 210 read in accordance with the process explained in connection with FIG. 17 and store these video signals respectively. A sense unit 305 is adapted to sense the position (address) of any dust or defect in the frame, on the basis of the video data stored in the IR image memory 304. A correction processing unit 306 is adapted for effecting a later-mentioned processing for correction of the R, G, and B video data derived from the respective image memories 301, 302, 303, on the basis of the data (address data) concerning the position of the dust or defect sensed by the sense unit 305.

Figure 21:
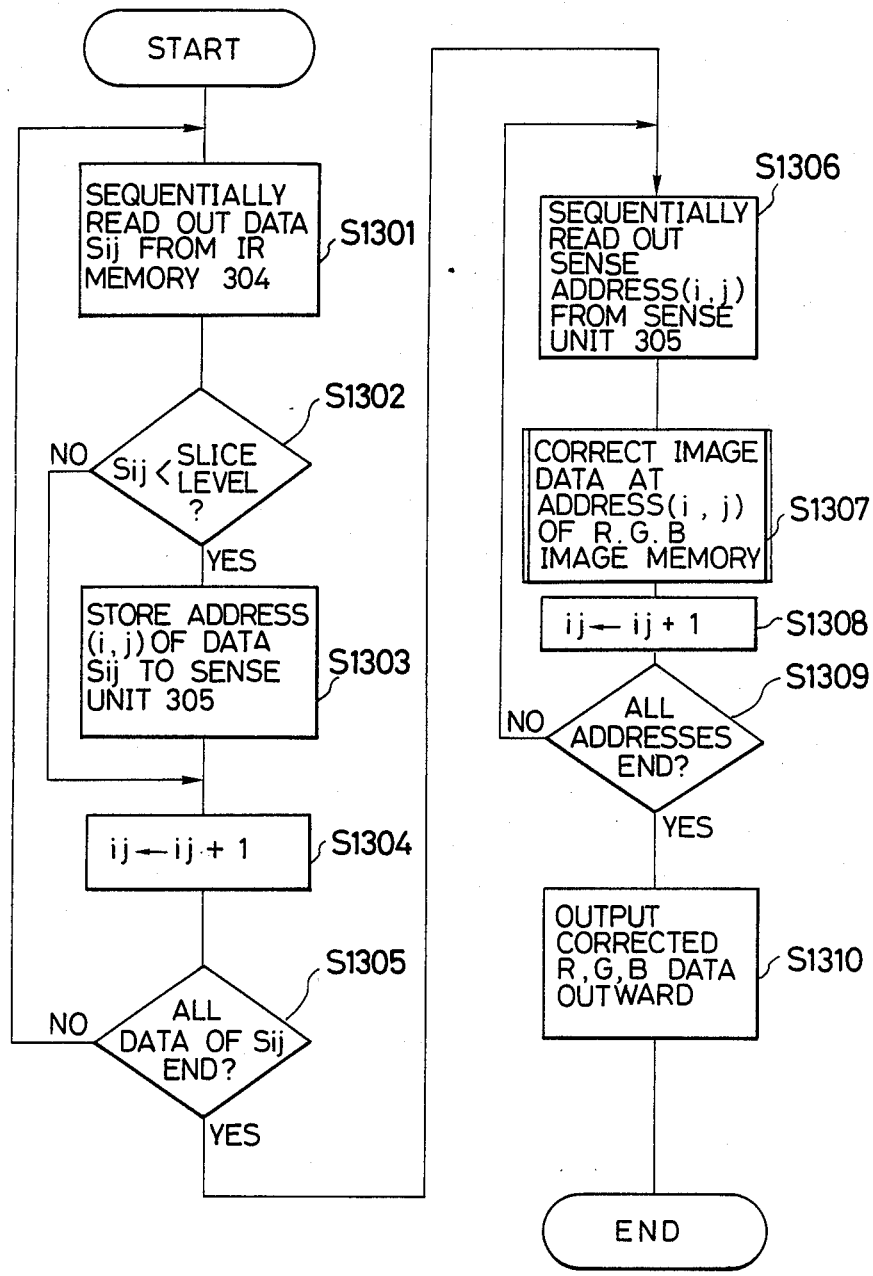
FIG. 21 is a flow chart illustrating the operations of a sense unit and correction unit in the sense/correction unit shown in FIG. 21.

The process for sensing the dust or defect will be explained hereinunder with reference to the flow chart shown in FIG. 21. In Step S1301, video data $S_{ij}$ (i represents the line direction, while j represents the address of the read line) are successively read from the IR image memory 304. Then, the presence of any dust or defect is examined by making use of the principle explained before in connection with FIG. 15. Namely, the video data $S_{ij}$ successively read from the IR image memory are compared with a predetermined slice level which is selected as being a threshold for the judgment as to whether any dust or defect exists, whereby a judgment is made as to whether the levels of the successive video data $S_{ij}$ are below the slice level (Step S1302). Then, the addresses (i, j) of the video data of levels below the slice level are successively stored in the internal memory of the sense unit 305 (Steps S1303 to S1305).

Then, the correction processing unit 306 conducts the following correction process (1), (2) or (3) in sequence on the R, G and B video data stored in the respective image memories 301, 302, 303, on the basis of the address data stored in the sense unit 305 concerning the addresses of the dust or defect (Steps S1306 to S1308).

In the following explanation, $S_{ij}$ represents the video data stored in the respective image memories 301, 302 and 303 for R, G and B colors and having address corresponding to the addresses sensed by the sense unit 305.

$$S_{ij} = S_{i-1,j} \tag{1}$$

video data corresponding to the dust is replaced with the video data immediately preceding thereto $$S_{ij} = (S_{i-1,j} + S_{i,j-1} + S_{i,j+1} + S_{i+1,j})/4 \tag{2}$$

The video data corresponding to the dust is replaced with mean value of the address which are on the upper side, lower side, left side and right side of the address corresponding to the defect.

$$S_{i,j+n} = S_{i,j} + n/m(S_{i,j} - S_{i,j+m+1}) \quad (3)$$

where, in=1 to m

When the dust or defect exists over a plurality of picture elements, the series of video data corresponding to the defective picture elements are interpolated with immediately preceding and following video data.

The procedure (1) to (3) explained above are only illustrative. The R, G and B video data after correction are output to the outside of the apparatus as the R, G and B output signals (Step S1310).

As has been described, in the second embodiment the present invention, the visible ray video data and the infrared video data for the purpose of detection are read by the same image sensor. The following advantages are derived from this arrangement.

(1) It is possible to eliminate any offset or deviation between the visible ray video data and the infrared ray video data.

Furthermore, particularly for the reason that the infrared ray video data is read while the subscan system is being driven continuously:

(2) Since an effect similar to that of a low-pass filter is obtainable, it is possible to suppress any sensing error which may be caused by edges of dust and defects.

(3) The reading time can be shortened due to the continuous scan.

(4) The unfavorable effect of heat and light on the film original can be minimized.

A third embodiment of the present invention will be described hereinunder. The third embodiment is a film image data reading apparatus for converting the image data carried by a film original into electrical signals through a photoelectric conversion device, which is characterized by comprising a wavelength selection means disposed so as to be inserted as desired into the optical axis of a reading optical system for reading the original image data and adapted for transmitting mainly infrared rays, displacement means for materially displacing the photoelectric conversion device from the focal position of the projection optical system when the wavelength selection means is inserted into the optical axis, and sense means for sensing the position of any dust or defect on or in the optical system and/or the film original on the basis of the image data read by the photoelectric conversion device displaced by said displacement means.

When the wavelength selection means which transmits mainly infrared rays is inserted into the optical axis of the reading optical system, the displacement causes the photoelectric conversion device to be materially displaced from the focal position of the projection system, and image data is read from the film original by the thus displaced photoelectric conversion device. Thus, the same photoelectric conversion device is used both for the reading of image data at the focal position of the projection optical system and the reading of the same at the position after displacement. Then, the position of the dust or defect on the film original is sensed by the sense means, on the basis of the thus read image data.

According to this embodiment, therefore, the occurrence of positional offset between the visible ray video data and the infrared ray video data is suppressed thereby reducing and sensing error which may otherwise be caused by edges of the dust or defect.

Figure 22:
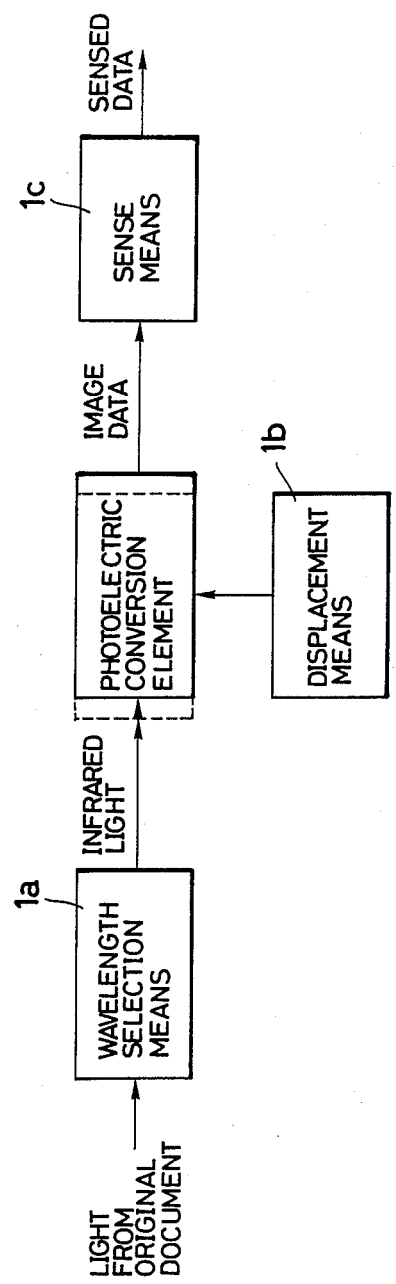
FIG. 22 is a block diagram showing the basic arrangement of a third embodiment of the present invention.

FIG. 22 shows the basic arrangement of the second embodiment. Referring to this Figure, a wavelength selection means 1a is disposed such as to be inserted as desired into the optical axis of the lighting optical system or the projection optical system. A displacement means 1b is adapted for displacing the photoelectric conversion element from the focal position of the projection optical system when the wavelength selection means is placed in the optical axis. A sense means 1c is adapted to sense the position of any dust or defect on the film original on the basis of the video data which is read by the photoelectric conversion element displaced by the displacement means.

Figure 23:
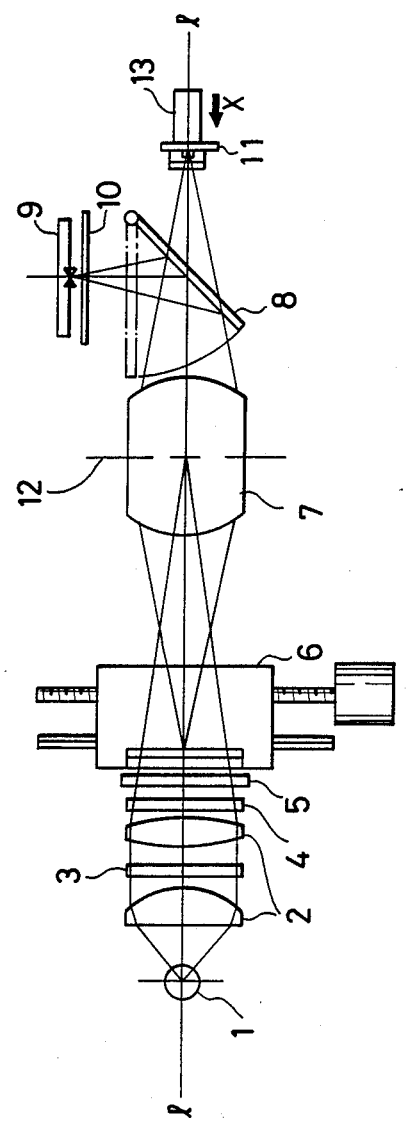
FIG. 23 is a schematic illustration of a film scanner incorporated in the third embodiment of the present invention.

The third embodiment also employs a mechanism provided in the film scanner and adapted for oscillating the sensor 11. The construction of the film scanner is schematically shown in FIG. 23. Other portions of the third embodiment are materially the same as those shown in FIG. 3.

Referring to FIG. 23, the film scanner has a driving mechanism for causing the small displacement of the sensor 11 in the direction of the optical axis is denoted by a reference numeral 13. The driving mechanism 13 is constituted by, for example, laminated piezoelectric elements, and is capable of effecting a very small displacement on the order of several tens of micron meters ($\mu$m). The arrangements of the subscan system, filter changing mechanism and the shutter driving mechanism are the same as those in the first and the second embodiments.

In operation of the third embodiment, the sensor 11 is displaced by a very small amount in the direction of the optical axis (direction of arrow X in FIG. 23) by the operation of the driving mechanism 13 shown in FIG. 23, so as to position the sensor 11 at an offset from the focal point of the projection lens 7. In consequence, the image of the dust on the projection system or the defect in the film is projected on the sensor 11 in a somewhat defocused state, i.e., the size of the projected image of such dust or defect is greater than that of the actual one so that the sensor 11 produces a video output of image of such dust or defect on a larger scale than the actual one.

Figure 24:
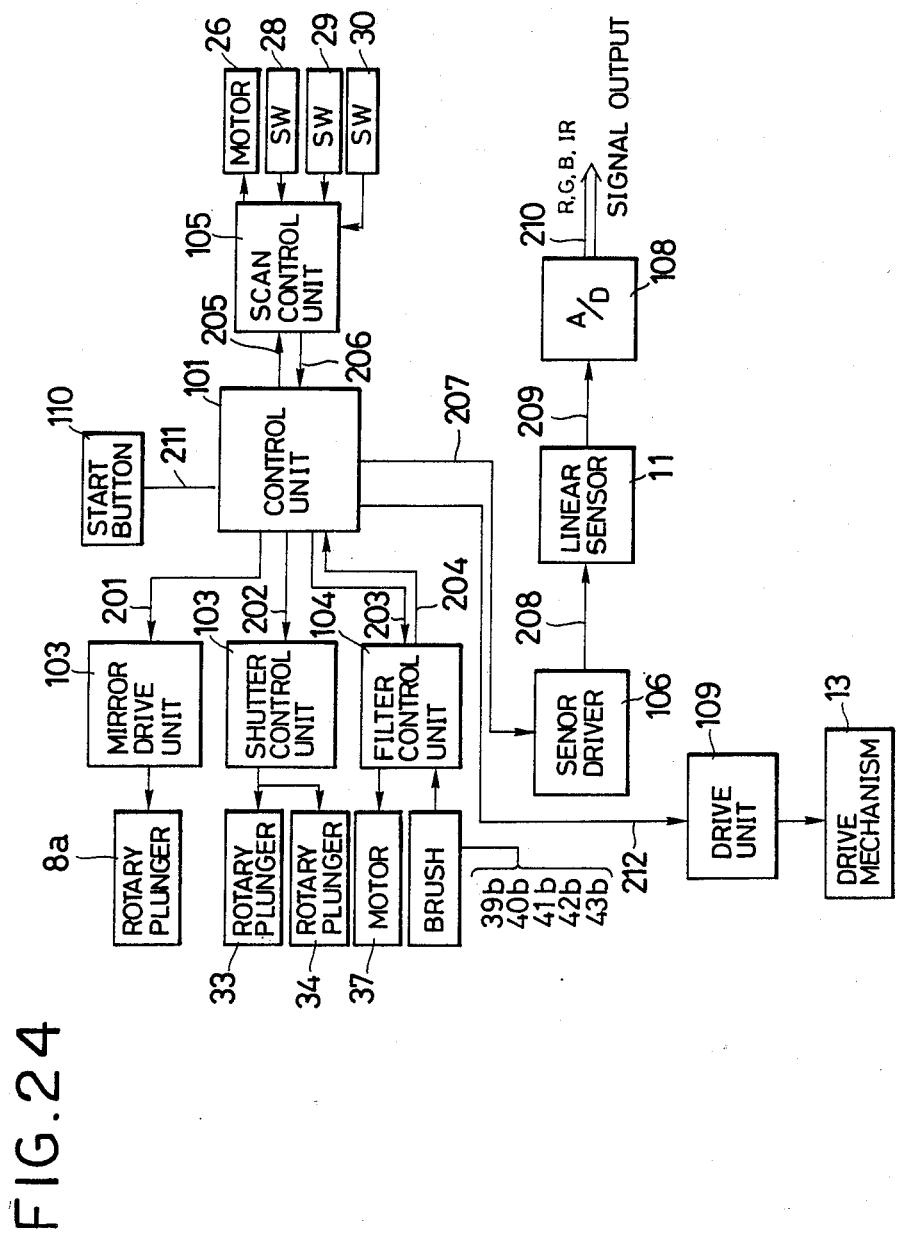
FIG. 24 is a block diagram of a color film scanner incorporated in the third embodiment of the present invention.

FIG. 24 shows the circuit arrangement of the film scanner incorporated in the third embodiment shown in FIG. 23. Referring to this Figure, a control unit 101 is adapted to control motors and sensors in accordance with the process which will be explained later with reference to FIG. 25. The film scanner further has a mirror drive unit 102 which drives and controls the rotary plunger 8a for opening and closing the mirror 8, a shutter control unit 103 for driving and controlling the rotary plungers 33, 34 of the shutter mechanism 5, a filter control unit 104 for driving and controlling the motor 37 of the filter changing mechanism 4, and a scan control unit 105 for driving and controlling the motor 26 of the subscan system 6. A numeral 106 designates a sensor driver for driving and controlling the linear sensor 11, while a numeral 108 designates an A/D converter for successively converting the analog outputs from the self-scan type linear sensor 11 such as CCD into corresponding digital signals. These arrangements are materially the same as those in the first and the second embodiments.

In the third embodiment, the film scanner further has a drive unit 109 for driving and controlling the driving mechanism 13 for effecting a very small displacement of the sensor 11.

The detail of the operation of the third embodiment will be explained hereinunder with reference to flow chart shown in FIG. 25.

When the film original is observed by eyes through the finder, the mirror 8 is in the optical path 1—1 while the center of the film original holder 27 is in the center of the optical axis. The light-shielding plates 31 and 32 of the shutter mechanism 5 are opened. In addition, the pass-through portion 35b of the filter changing mechanism 4 is placed in the optical axis. In this state, the user or operator confirms the state of the image on the film original through the print plate 9 of the finder.

As a start button 110 is pressed, a scan-start signal 211 is generated in Step S3001, so that the control unit 101 delivers a mirror drive signal 201 to the mirror drive unit 102 thereby activating the rotary plunger 8a so as to retract the mirror 8 from the optical path (Step S3002). Subsequently, the control unit 101 delivers a shutter drive signal 202 to the shutter control unit 103, thereby activating the pair of rotary plungers 33, 34 so as to drive the light-shielding plates 31, 32 of the shutter mechanism 5, thereby shielding the sensor from harmful light such as ghost flare (Step S3003).

At the same time, the control unit 101 delivers a filter control signal 203 to the filter control unit 104, so as to insert a color separation filter into the optical axis. Assuming here that the video data is read in a sequence represented by R, G, B and IR, the filter control unit 104 first places the R filter 35c in the optical axis in response to the filter control signal 203, by driving the motor 37 until this filter 35c is positioned in the optical axis, i.e., until the potential of the brush 39b is reduced to the low level (Step S3004).

After the potential of the brush 39b is reduced to the low level, the filter control unit 104 sends to the control unit 101 a filter change completion signal 204 which represents that the change of the filter has been finished.

Then, the process proceeds to Step S3005 in which a subroutine as shown in FIG. 18 is conducted. After the completion of the R video data in the subroutine, the process returns to the main routine. In Step S3006, the control unit 101 activates the filter control unit 104 in accordance with the filter control signal 203 for the purpose of changing the filter. In consequence, the motor 37 is driven until the G filter 35d is placed in the optical axis 1—1, i e., until the potential of the brush 40b is reduced to the low level.

After the G filter 35d is selected in this manner, the process proceeds to Step S3007 in which the same processing cycle as that explained in connection with the R video data (Steps S1101 to S1107 in FIG. 18) is conducted repeatedly, thus reading the G video data.

The B video data also is read from the linear sensor 11 in Steps S3008 and S3009 in accordance with the same procedure.

After the completion of reading of the B video data, the control unit 101 operates to change the filter, i.e., to insert the IR filter into the optical axis while withdrawing the B filter from the optical axis in Step S3010. At the same time, the drive unit 109 operates in response to the control signal 212 so as to activate the driving mechanism 13 to thereby displace the sensor 11 in the direction of the optical axis, thus completing the preparation for the reading of the IR video data (Step S3011). Then, the process proceeds to Step S3012 in which the operation which is the same as steps S1101 to S1107 shown in FIG. 18 is conducted to read the IR video data.

Figure 25:
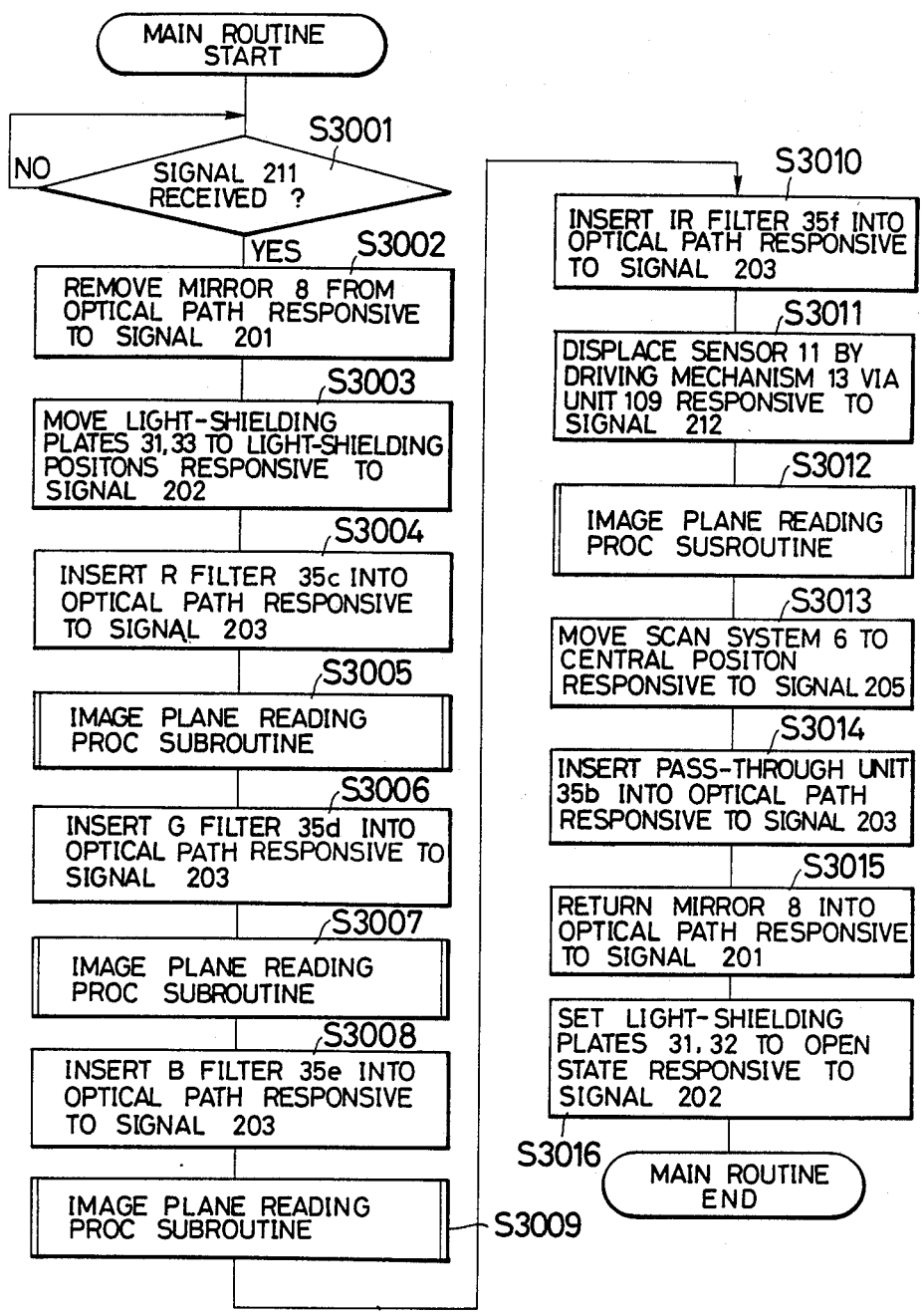
FIG. 25 is a flow chart illustrating the process of the control performed by the control section 101 in the color film scanner shown in FIG. 3.

After the completion of reading of the video data from one frame, the process returns to the main routine shown in FIG. 25, so that the control unit 101 delivers a scan control unit 105 by delivering to the same a scan control signal 205, thereby activating the motor 26 so as to position the subscan system 6 at the mid point of the subscan (Step S3013). After completion of the driving of the subscan system 6, i.e., after the switch 29 is turned on, the control unit 101 sends a filter control signal 203 to the filter control unit 104 thereby activating the motor 37 so as to insert the pass-through portion 35b of the filter changing mechanism into the optical axis (Step S3014). Then, the control unit 101 delivers a mirror driving signal 201 to the mirror drive unit 102 so as to return the mirror 8 into the optical axis in Step S3015. At the same time, a shutter driving signal 202 is fed to the shutter control unit 103 so that the rotary plungers 33, 34 are activated to open the light-shielding plates 31, 32 (Step S3016), whereby a series of operations for reading and processing the image data on the film original is completed. The description as to the process for sensing any dust or defect attaching to or residing in the optical system and/or the film original, as well as the process for correcting the video signals in accordance with the result of sensing of the dust or defect, is omitted because the processes are the same as those used in the second embodiment.

In the third embodiment of the present invention, the sensor is displaced in the direction of the optical axis, in order to create a defocused condition. This, however, is not essential and the same effect can be obtained by making a positive use of the infrared aberration of the projection lens.

As will be understood from the foregoing description, according to the invention, the visible ray video data and the defect detecting infrared ray video data are read and processed by the same image sensor. It is, therefore, possible to eliminate any positional offset between the visible ray video data and the infrared ray video data. In addition, the sensor is displaced in the direction of the optical axis during reading of the infrared ray video data so as to create a defocused condition, thus producing an effect similar to that of a low pass filter. Therefore, it is possible to magnify the image of the dust or defect to be projected and, hence, to eliminate any sensing error which may otherwise be caused by the edges of the dust or defect.

A fourth embodiment of the present invention will be explained hereinunder. Briefly, in this fourth embodiment, any defect such as dust or flow is sensed and digital signals representing the mapping data of the defective position is stored in a high speed memory. Then, the image data of the defective position is corrected by using pieces of data obtained from the picture elements around the defective position.

The fourth embodiment will be described in detail hereinafter with reference to the drawings.

FIG. 25 shows the basic arrangement of the image pickup apparatus as the fourth embodiment of the present invention. As will be seen from this Figure, the fourth embodiment includes the following elements or components: an illuminating lamp 501; a lighting optical system 502; a holder 503 for optical filter; optical filters 503-1 to 503-4; a transmitting original as an object; an original holder 505 for holding the original 504; a stage 506 for mounting the original holder 505; an image pickup lens 507 for projecting the image of the original 504 onto a line sensor 508 and having an optical axis C; a line sensor 508 for conducting reading in the main scan direction; an amplifier 509 for amplifying the output of the line sensor; a sequence control circuit 510 of the image pickup apparatus; an optical filter driving mechanism 511 for changing the optical filters 503-1 to 503 4; a stage driving means 512 for driving the stage 506 mounting the holder 505 thereby effecting a subscan; an optical filter selection circuit 513 for activating the optical filter driving mechanism 511 so as to select the desired optical filter; a subscan control circuit 514 for controlling the stage driving means so as to control the subscan; a line sensor driving circuit 515 for driving the line sensor 508 thereby effecting main scanning; a defect detection circuit 516 for detecting presence of a defect such as dust or flaw upon receipt of the output (Vos) from the amplifier 509; a defect count circuit 517 for counting the defect detected by the defect detection circuit 516, in accordance with a predetermined counting rule which will be explained later; a defect map 518 circuit for storing the position or address of the defect detected by the defect detection circuit 516; an A/D converter 519 for conducting analog-to-digital conversion of the output Vos of the amplifier 509; a buffer memory 520 for temporarily storing the digital video signal derived from the A/D converter 519; a defect correction circuit 521 for correcting the content of the buffer memory 520 in accordance with the output from the defect map circuit 518; an interface circuit 522 for transferring the content of the buffer memory to an external equipment or a host computer; and a warning circuit 523 which generates a warning in response to a warning generating instruction given by the sequence control circuit 510 in accordance with the amount of defect measured by the defect count circuit 517.

The operation of the fourth embodiment will be explained hereinafter. In the operation, a main scan is performed by the line sensor 508, while a subscan is carried out by driving the stage 506 carrying the original holder 505 by means of the driving source 512, whereby a two dimensional scan is conducted.

The transmitting original as the object, e.g., a 35 mm film, is uniformly lighted by the lighting optical system 502 having the illuminating lamp 501 such as a halogen lamp, and the image of the original 504 is formed on the line sensor 508 through the image pickup lens 507. It is possible to effect a color separation of the original image into three colors by using filters which transmit R, G and B colors or cyan, magenta and yellow colors as the second to fourth optical filters 503-2 to 504-2. Subsequently, main scan is conducted over the image projected onto the line sensor 508. At the same time, subscan is effected by driving the age 506 such that the image of the original 504 projected on the line sensor moves in the direction perpendicular to the direction of the main scan performed by the line sensor 508. It is thus possible to effect a two dimensional scan.

For the purpose of changing the filter, filter numbers and filter selection instructions are delivered to the filter selection circuit 513 from the sequence control circuit 510, to thereby effect the filter selection operation so as to control the filter driving means 511 thereby selecting the desired one of the optical filters 503-1 to 503-4.

In this case, an infrared transmitting filter for example is used as the first optical filter 503 1. Since color generating layers of the photographic film transmit most of the infrared rays, the output from the line sensor 508 assumes a substantially constant level. However, the level of the output is changed significantly when there is a defect such as dust or a flaw on or in the film because in such a case the transmittance is locally changed at the defective position. It is, therefore, possible to easily detect any defect on the film by checking the amplified signal Vos. To explain in more detail, it is possible to eliminate any undesirable effect produced by any defect such as dust or flaw on or in the optical filter on the image projected on the line sensor 508, by suitably arranging the optical filter.

The sequence control circuit 510 is adapted to perform a control in accordance with the following sequence.

The sequence circuit 510 first selects the first filter 503-1 for the detection of defect, and gives an instruction to the subscan control circuit 514 so as to return the stage 506 to the subscan start position. After the completion of selection of the first filter while the stage 506 is returned to the start position, the process proceeds to a mode for detecting defecting the original 504.

In the defect detection mode, any defect such as dust or flaw on the original 504 is detected by the defect detection circuit 516 on the basis of the signal $V_{os}$ obtained by scanning the original 504 with infrared rays, and pieces of data concerning the position where the defect exists are successively stored in the defect map circuit 518. At the same time, the amount of the defect is counted by the defect count circuit 517 in accordance with a predetermined level, and the thus counted extent of the defect is delivered to the sequence control circuit 510.

When the defect amount exceeds a predetermined level, the sequence control circuit 510 delivers a warning generation instruction to the warning generation circuit 523. The warning generation circuit 523 then generates warning upon receipt of this instruction.

Then, the sequence control circuit commences next operation. The warning may be generated in steps in accordance with the level or extent of the defect. The arrangement may be such that the defect count circuit 517 informs the sequence control circuit 510 of the presence of any defect only when the extent of the detected defect exceeds a predetermined level. It is also possible to arrange the device such that the count circuit 517 directly transmits a warning generation demand to the warning generation circuit 523, without the intermediary of the sequence control circuit 510.

After the completion of operation in the defect detection mode, the operation in color separated scanning mode is commenced unless the sequence control is suspended. In this mode, two-dimensional scanning is conducted three times, i.e., once for each of filters 503-2, 503-3 and 503-4 which transmit three colors.

As the first step, the sequence control circuit 510 delivers an instruction to the optical filter selection control circuit 513 for selecting the second optical filter 503-2 so as to drive the optical driving source 511 thus selecting the second filter 503-2. The sequence control circuit 510 also delivers an instruction to the subscan control circuit 514 so as to return the stage 506 to the start position. In consequence, the stage driving means 512 is driven to return the stage 506 to the start position.

When the stage 506 is returned to the start position after the selection of filter, the color sensor 508 commences the scanning of the image which is color-separated by the second optical filter 503-2. The signal $V_{os}$ amplified by the amplifier 509 is converted by the A/D converter into digital signals and the thus obtained digital signals are stored temporarily in the buffer memory 520.

The video signals temporarily stored in the buffer memory 520 are corrected by the defect correction circuit 512 in accordance with the defect position data derived from the defect map circuit 518. When the amount of defect in the main scan line is comparatively small, the content of the buffer memory 520 can be corrected by means of for example, a microprocessor during the subscan.

The correction of the memory content is conducted in accordance with the following procedure.

The addresses of the defects in the main scan line are successively fed from the defect map circuit 518 into the defect correction circuit 512. Then, judgment is made in accordance with the defect address data as to whether the noted defect is elongated in the direction of the main scan or extends only to a small extent in the direction of the main scan. When the length of the defect is as short as n or less in terms of the number of the picture elements, the correction is effected by substituting the data concerning the defective picture elements by the data of the preceding picture elements or the data in the following picture elements. It is also possible to effect the correction by linear interpolation. When the defect is as long as n or greater in terms of the number of the picture elements, the correction may be effected by substituting video data of the preceding line, i.e. by the data which is adjacent thereto in the direction of the subscan.

Thus, the data in the continuous defect which has a small length in the direction of the main scan can be corrected only with the data in the same line. In addition, even when the defect has a considerable length in the direction of main scan, it can be effectively corrected provided that its length in the direction of subscan is not so long. It is thus possible to easily correct any defect which has an elongated pattern. When it is specifically required to effect a high-speed correction, it is recommended to construct a portion of the defect correction circuit 521 as a hardware. In such case, the correction of small defect can be effected in real time.

The corrected video data is transferred to an external equipment such as a disc, scanner writer or a frame memory or to a host computer through the interface circuit. The frequency of the data transfer depends on the factors such as the processing speed of the buffer memory or the external equipment. For instance, the data transfer can be conducted for each one-line scan or for each frame.

After the completion of the scan of the color separated image processed through the second optical filter 503-2, a control is conducted for selecting the third optical filter 503-3 and for returning the stage 506 to the start position. This control is conducted in the same procedure as that for the second optical filter 503-2 explained before. The same procedure is taken also for the scanning of the image color-separated by the fourth optical filter 503-4, thus completing the operation for picking up three color separated images.

Figure 26:
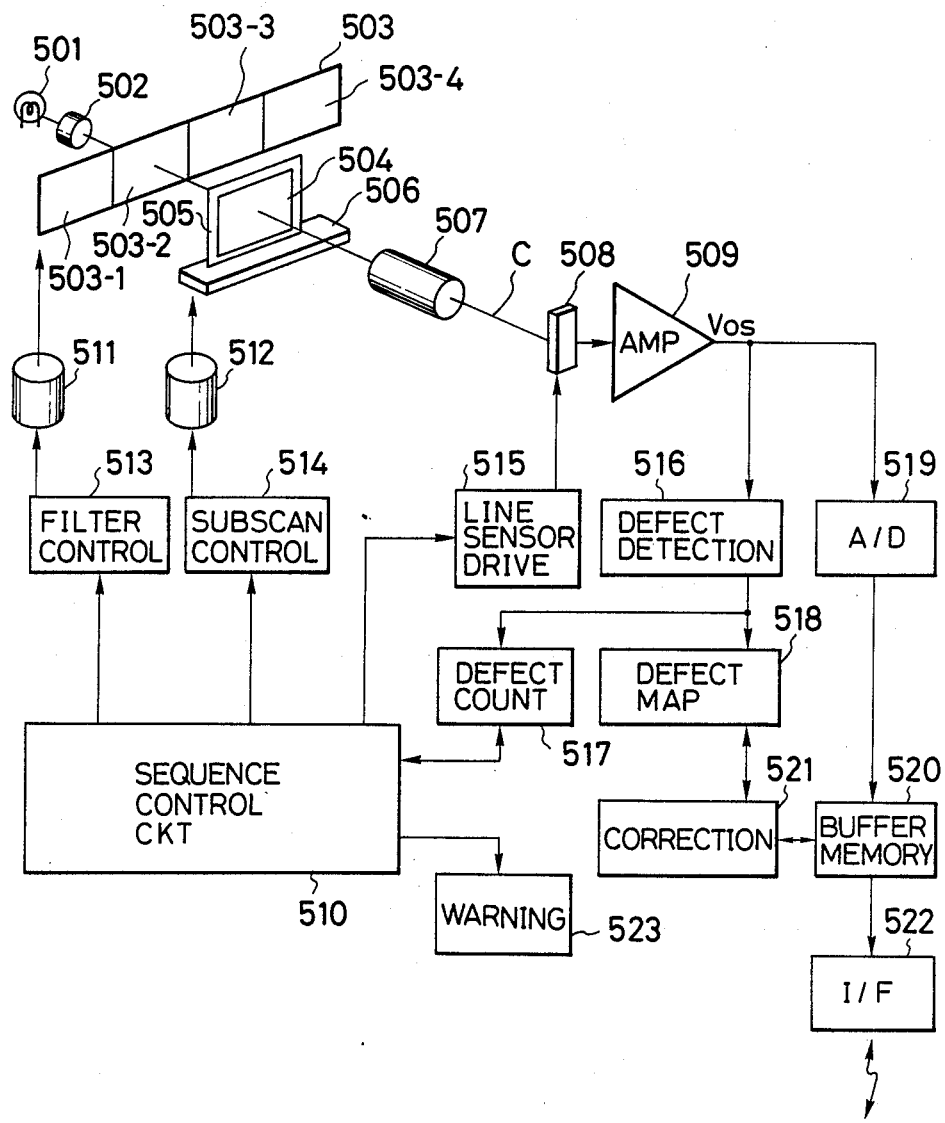
FIG. 26 is an illustration of the whole portion of a fourth embodiment of the present invention.
Figure 27:
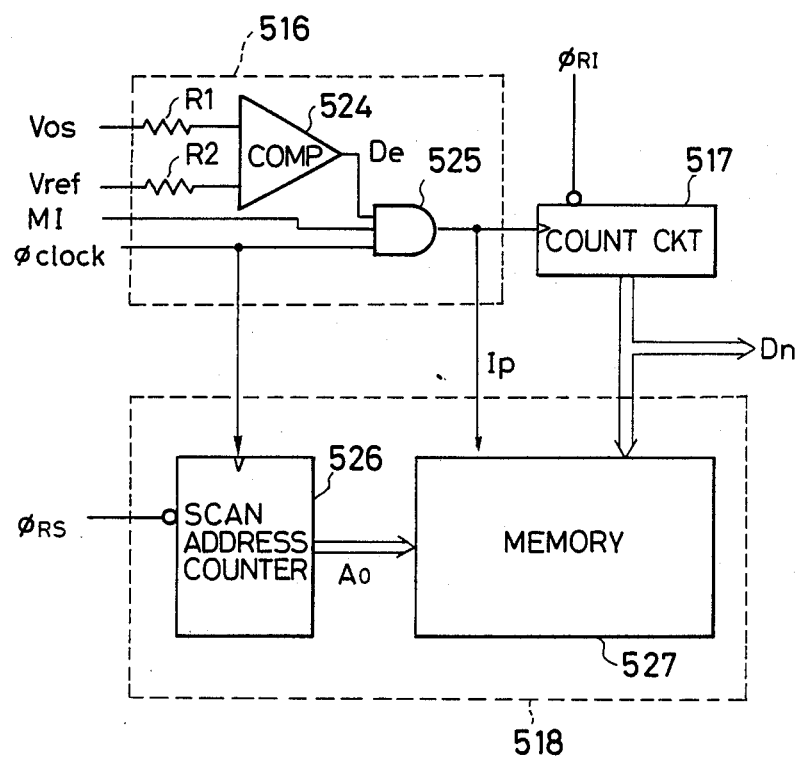
FIG. 27 is a block diagram showing the detail of a portion of an element incorporated in the embodiment shown in FIG. 26.

FIG. 27 shows the detail of the defect detection circuit 516, defect count circuit 517 and the defect map circuit 518 shown in FIG. 26. This figure shows the following components: resistors R1 and R2; comparator 524 for comparing the output signal $V_{os}$ from the amplifier 509 with the reference voltage $V_{ref}$; a defect signal De (output of the comparator 524) detected on the basis of the output signal; a defect detection mode signal MI representing that the present mode is a defect detection mode; a timing clock $\Phi$ which is produced once for each picture element when the scan is conducted in the effective region of the scan; an AND gate 525 for generating a defect pulse Ip when there is a defect; a defect count circuit 517 for counting the number of the defect pulses Ip; a reset signal $\Phi_{R1}$ for resetting the defect count circuit 517; a defect count signal Dn representing the number of the defective picture elements; a scan address counter 526 representing the instant position of the scan; a scan address signal Ao representing the instant position of scan; and a memory circuit 527 for receiving the address signal Ao on the basis of the count number Dn so as to store the data Ao in the addresses represented by the count numbers Dn in synchronism with the defect pulse Ip.

The operation of the circuit shown in FIG. 27 will be explained hereinunder.

When the scanning is commenced, the defect count circuit 517 is reset by the reset signal $\Phi_{R1}$ so that the content Dn of the defect counter becomes zero (0). The reset signal $\Phi_{R1}$ also resets the scan address counter 26 so as to initialize the scan address Ao to "0".

When a defect detection mode signal MI is changed to "1" so that the signal $\Phi_1$ is dismissed, thus enabling the defect counter circuit 517 to count. The timing clock $\Phi$clock is generated in synchronism with the signal $V_{os}$ obtained by amplification of the sensor output when the present position of scan is within the effective region of scan. When there is a defect, the level of the signal $V_{os}$ becomes lower than $V_{ref}$ so that the signal De is changed to a "high" level. In consequence, the AND gate 525 is opened (De="high", MI="high") in synchronism with the timing clock $\Phi$clock so that the defect pulse Ip transmitted through the AND gate 525 is counted up.

The defect count signal Dn as the output from the defect count circuit 517 is delivered to the sequence control circuit 510 and is used also as the address input to the memory circuit 527. Thus, the defect count signal Dn represents that the defect is the Dn-th defect.

The timing clock $\Phi$clock is supplied also to the an address counter 526. The counter 526 counts the number of the picture element which is being scanned as counted from the scan start position. The scan address signal Ao as the output from the scan address counter 526 is supplied to the input terminal of the memory circuit 527 and is written in the address "Dn" in the memory circuit 527 in synchronism with the defect pulse Ip. Thus, the scan address "Ao" obtained when the "Dn"—the defect is detected is stored in the memory circuit 527.

The circuit for initializing the memory circuit 527 is not shown. This, however, can be conducted by writing "1" or "1" in all the addresses or, alternatively, an address which is out of the scan region is written in advance of defect detection mode operation, i.e., before the resetting of the defect count circuit 517 and the scan address counter 526. The sequence control circuit 510 can produce a warning instruction upon detection of overflow of the defect count circuit 517.

Figure 28:
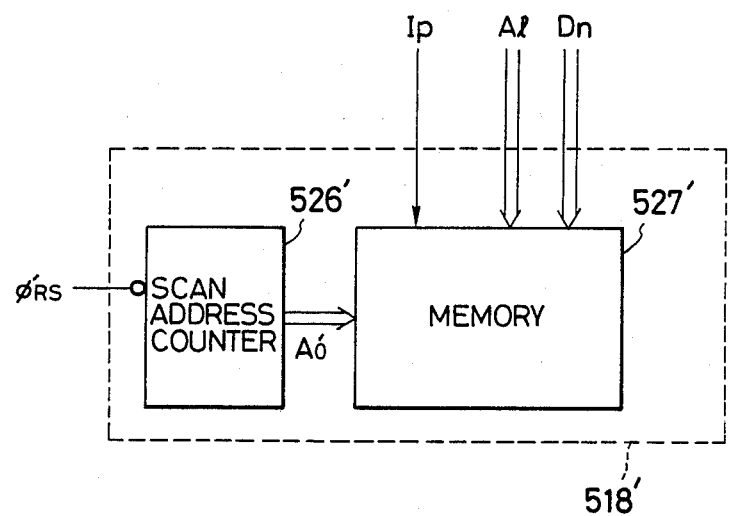
FIG. 28 is a block diagram of another example of the element shown in FIG. 26.

FIG. 28 is a block diagram of another example 518' of the defect map circuit 518. In this example, only the address Ao' in the direction of main scan is counted by the scan address counter 526'. As to the address Al in the subscan direction, the address signal is supplied to the address input terminal of the memory circuit 527' independently of the defect count signal Dn. The count value Ao' is stored in the memory circuit in synchronism with the defect pulse Ip. This example requires a predetermined memory region for each of line of the main scan. However, this arrangement offers an advantage in that the sequence control circuit 510 can issue a warning instruction upon detection of the fact that the number of defective picture elements on the main scan line has exceeded a predetermined number.

Figure 29:
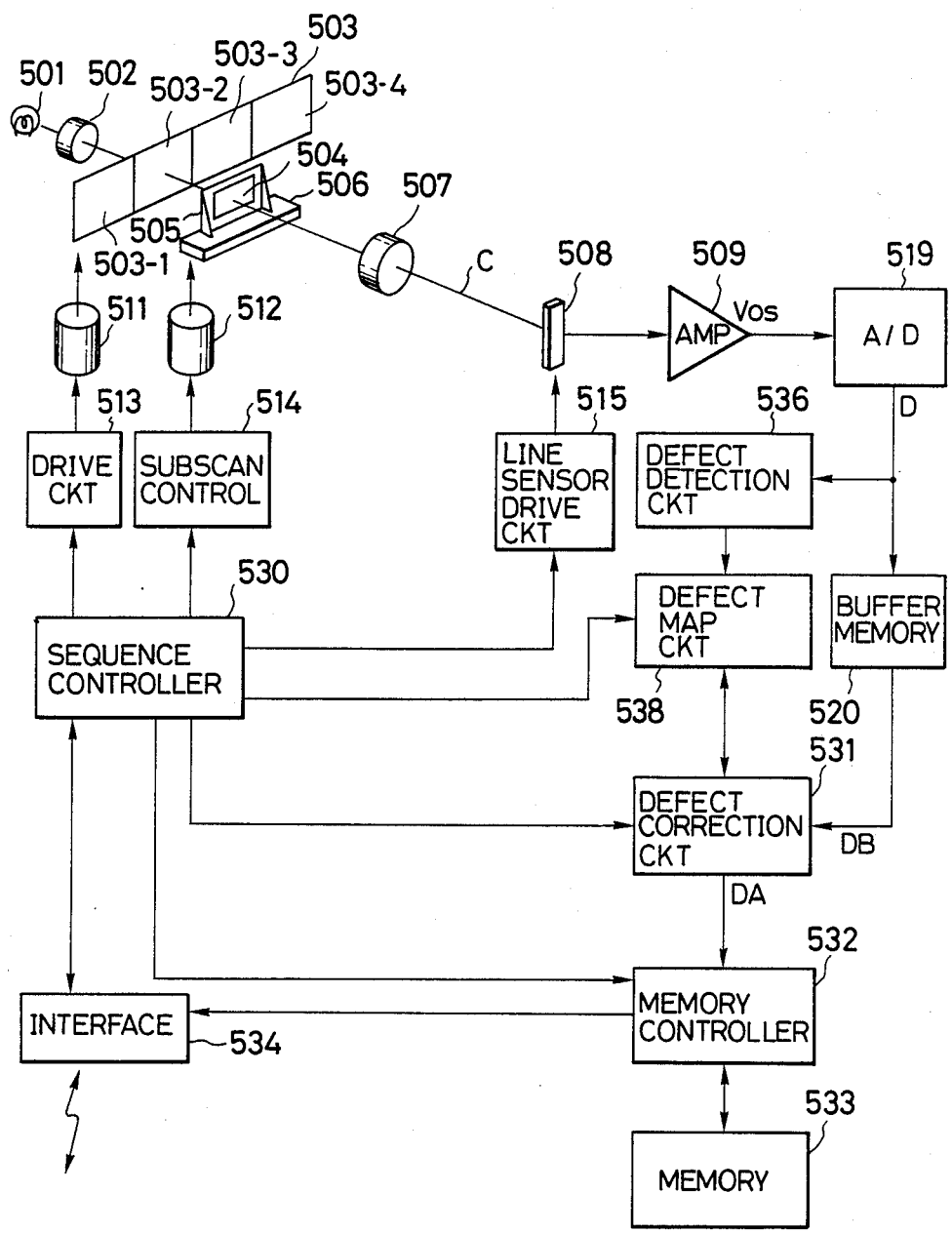
FIG. 29 is an illustration of the whole portion of a fifth embodiment of the present invention.

FIG. 29 shows the whole portion of a fifth embodiment of the present invention. In this Figure, the same reference numeral denotes the same elements as those appearing in FIG. 26. In addition to these elements common to FIG. 26, FIG. 29 show the following constituents: a sequence controller 530; a defect correction circuit 531; a memory controller 532 for recording the video data after defect correction in the memory means 533; memory means 533 for temporarily or permanently storing the picked-up video data; an interface circuit 534; a defect detection circuit 536; a defect map circuit 538 for storing data concerning position of defective picture element; video signal DB output from the buffer memory 520; and video signal corrected by defect correction circuit 531.

The sequence controller 530 controls the image pickup operation as in the case of the example shown in FIG. 26. In this example, however, the control sequence is slightly different from that of the example shown in FIG. 26 due to the additional provision of the memory means 33. The warning means is not shown in the drawings.

The operation of the circuit shown in FIG. 29 is as follows. The transmitting original 504 as the object is uniformly illuminated by the light source 510 through the lighting optical system 502. One of the optical filters 503-1 to 503-4 is placed between the light source 501 and the original 504. The optical filter may be contained in the lighting optical system 502.

To explain in more detail, in the illustrated case, the first optical filter 503-1 is an infrared transmitting filter having a peak value of transmittance in the infrared region, the second optical filter 503-2 is a filter which transmits red color, the third optical filter 503-3 is a filter which transmits green color, and the fourth optical filter 503-4 is a filter which transmits blue color. These filters are held by the filter holder 503. The selection of the filter out of four filters 503-1 to 503-4 is effected by the driving circuit 513 and the filter driving source 511 in response to the filter selection instruction which is given by the sequence controller 530.

The main scan of the illuminated original is effected by projecting the image of the original 504 on the line sensor 508. On the other hand a subscan is effected by fixing the original 504 to the stage 506 through the original holder 505 and driving this stage 506 by means of the subscan control circuit 514. Namely, the image of the original 504 projected on the sensor 508 is moved in the direction perpendicular to the direction of the main scan as a result of the movement of the stage, thus effecting the subscan.

The line sensor 508 is driven by the line sensor drive circuit 515 so as to conduct the main scan. The operation timing of the line sensor drive circuit 515 and the subscan control circuit 514 is controlled by the sequence controller 530.

The video signal output from the line sensor 508 is amplified by the amplifier 509, and the output signal $V_{os}$ is introduced into the A/D converter 519 so that digital video signal is derived from the A/D converter 519. The video signal D has different values depending on the position (x,y) of the scan. The value obtained at the scan position (x,y) will be expressed as D(x,y). The video signal D is delivered to the buffer memory 520 and also to the defect detection circuit 536.

When the control mode selected by the sequence controller 520 is a defect detection mode, the filter selection control circuit 513 selects the first filter (infrared) 503-1. Then, the defect signal detected by the defect detection circuit 536 is sent to the defect map circuit 538 so as to be stored as a defect map signal.

On the other hand, when the control mode is the video input mode, the image is picked up through one of the second to fourth filters 503-2 to 503-4 and defect signals are read from the defect map circuit 538. On the other hand, the video signals which have been temporarily stored in the buffer memory 520 after conversion into digital signals are read and transmitted to the defect correction circuit 531 for the purpose of defect correction. The signal DA after the defect correction is stored in memory means 533 such as a disc, under the control of the memory controller 532.

The interface circuit 534 has the function of transmitting the corrected video data stored in the memory means 533 to an external equipment or a host computer. The apparatus can be controlled through an external equipment by giving a command to the sequence controller through the interface circuit 534.

Figure 30:
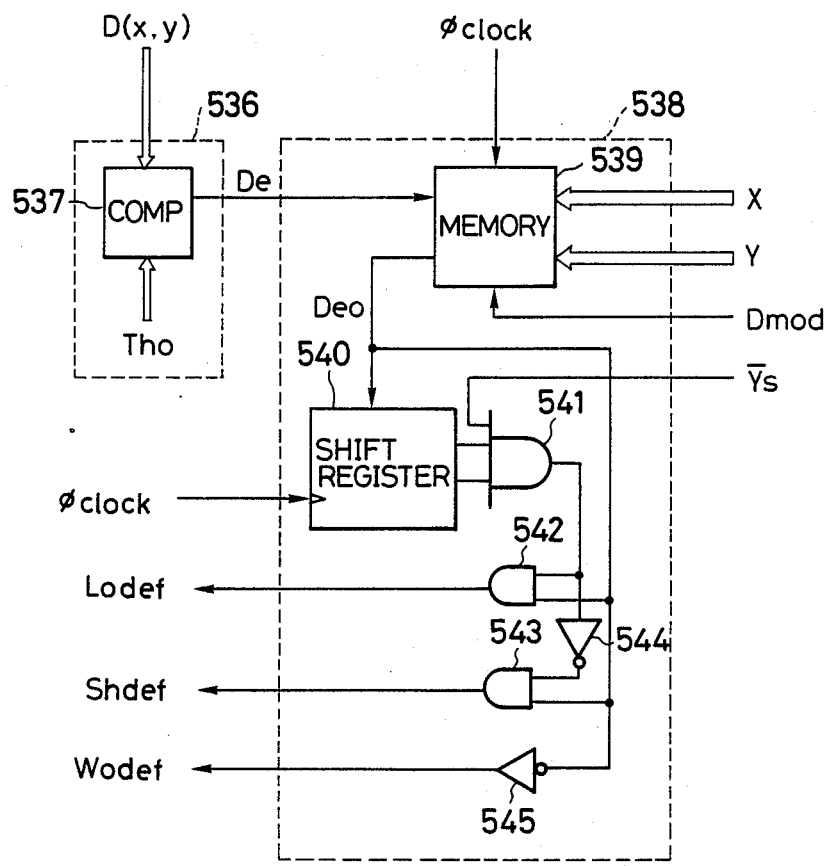
FIGS. 30 and 31 are block diagrams showing the detail of a portion of the element shown in FIG. 29.

FIG. 30 shows the detail of the defect detection circuit 536 and the defect map circuit 538 shown in FIG. 29. In this Figure, D(x,y) represents the output digital signal corresponding to the picture element (x,y) obtained through the A/D converter 519 from the sensor output at in the direction of the subscan. A numeral 537 designates a comparator for comparing a threshold digital value Tho with the output D(x,y) in the comparator 537. A symbol De represents the output of the comparator 537. This output takes a value "1" when the result of the comparison between D(x,y) and Tho is expressed by D(x,y)>Tho and a value "1" when the comparison result is D(x,y)≦Tho. Symbols X and Y represent, respectively, address signals representing the instant scan positions in the main scan and subscan directions. A symbol $\overline{Ys}$ represent a start line signal which takes a value "1" when the present scanning position is not on the scan start line. A defect detection mode signal Dmod takes a value "1" during detection of defect, while Φclock represents a sampling clock which is output in synchronism with the sampling of the picture elements within the effective region of scanning. These signals, X, Y, $\overline{Ys}$, Dmod and Φclock are delivered by the sequence controller 530. The circuit further includes the following elementary circuits: a defect map memory 539 for storing therein defect position data, a multi-input AND circuit (3-input AND circuit) 541, 2-input AND circuits 542, 543, inverter circuits 544, 545 and shift register circuit 540. A symbol Deo represents the defect signal read from the memory 539. A symbol Lodef represents the output from the 2-input AND circuit 542 which shows that a long defect exists in the present scanning position. A symbol Shdef represents the output from the 2-input AND circuit 543 which shows that a short defect exists in the present scanning position. A symbol Wodef represents the output from the inverter 545 which shows that there is no defect in the present scanning position.

The operation of the circuit shown in FIG. 30 is as follows. In the defect detection mode, the video signal D(x,y) derived from the A/D converter 519 (see FIG. 29) is obtained when the original 504 is illuminated by infrared rays. In this case, the image data printed on the original film is not read because the film transmits most of the infrared rays, so that the video data D(x,y) takes a uniform level when there is no defect such as a dust or a flaw. However, the transmittance of the film is locally changed if there is any defect. It is, therefore, possible to detect any defect on or in the film by comparing the video signal with the threshold value Tho in the comparator 537. When the defect is detected, the defect signal De takes the value "1", whereas, when no defect is detected, the defect signal De takes the value "0".

In this defect detection mode, the defect mode signal Dmod delivered by the sequence control circuit 530 (see FIG. 29) takes the value "1", so that the defect map memory 539 is set in a writing mode for writing defect data (symbols x and y represent the present scanning position and are used as the address of the defect data input to the defect map memory 539.) The writing of the defect signal De in the defect map memory 539 is conducted in synchronism with the signal Φclock which is the sample clock produced in synchronism with the generation of the digital video signal D(x,y).

The defect map memory 539 is a memory which is capable of writing one bit signal in each address, thus constituting a bit plane of the defect data for the scanning addresses x and y.

When the control mode is the video input mode, the signal Dmod is "0" so that the defect map memory 539 operates in the reading mode. The defect signals Deo (x,y) corresponding to the scanning addresses X, Y are read in synchronism with the clock Φclock and are changed into no defect signal Wodef after level inversion by the inverter 545. The defect signal Deo input to the shift register 540 is shifted by the clock Φclock so that the 3-input AND circuit 541 receive signals which are delayed one and two clocks, respectively. The AND circuit 541 receives the signal $\overline{Ys}$ which represents that the present scanning position is not on the scan start line. This signal $\overline{Ys}$ takes a value "1" when two successive picture elements immediately before the present picture element are defective while the present scanning position is not on the start line. Therefore, if the picture element on the instant scanning position is defective, the output of the AND circuit 542 takes the value "1", so that it is understood that the instant picture element is involved in a long defect. Thus, the long defect signal Lodef is changed to "1".

The output of the AND circuit 541 is delivered to the AND circuit 543 through the inverter 544. Since the other input to the AND circuit 543 is Deo, the signal Shdef takes the value "1" when a defect which meets the condition of Lodef≠1, i.e., a short defect or a defect which exists in the scan start line. Thus, the signals Lodef, Shdef and Wodef take the value "1", respectively, when the instant defective picture element is involved in a long defect, when the instant defective picture element is included in a short defector in a defect which exists in the scan start line, and when the instant picture element is not defective.

Figure 31:
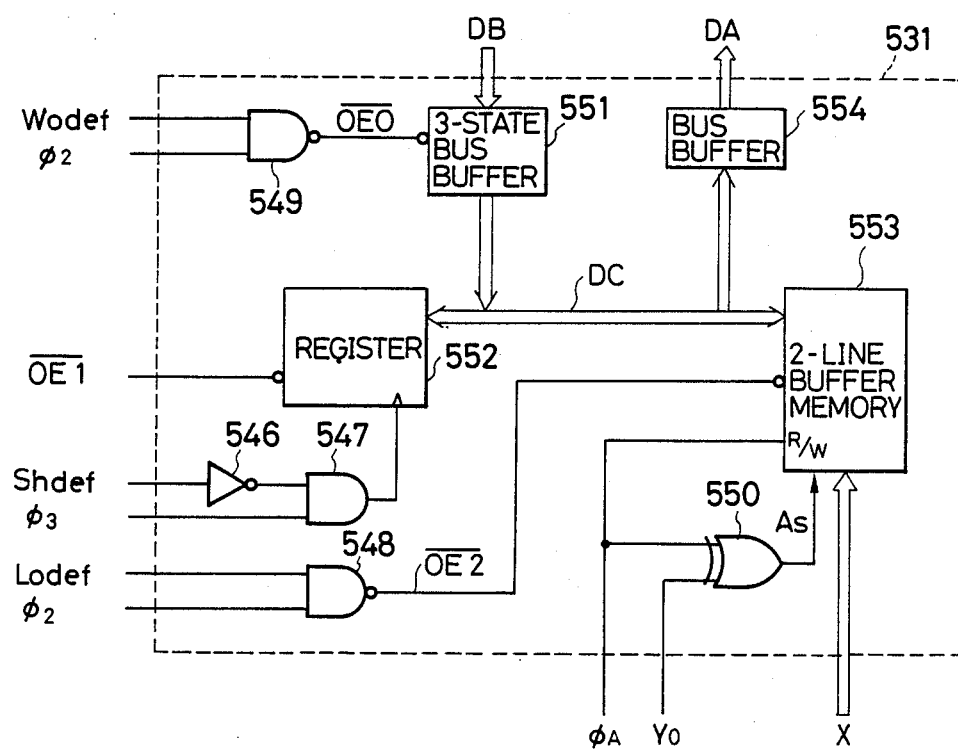

FIG. 31 shows the detail of the defect correction circuit 531 shown in FIG. 29. The circuit includes an inverter circuit 546, an AND circuit 547, NAND circuits 548 and 549, and an exclusive OR circuit 550. Symbols $\Phi_4$, $\Phi_2$, $\Phi_3$ and $\overline{OEI}$ represent timing signals which are synchronous with the clocks Φclock, as will be explained later. Symbols $\overline{OEO}$ and $\overline{OE2}$ represent output enable signals derived from NAND circuits 549 and 548. A symbol Yo represents the lowest bit (LSB of Y) of the address signal in the subscan direction.

The circuit further has a 3-state BUS buffer 551 which is adapted to output the input signal DB to the internal data BUS DC when the output enable signal $\overline{OEO}$ is in the assert level (low level). When the output enable signal $\overline{OEO}$ is in the deassert level (high level), the 3-state BUS buffer 551 produces an output of high impedance. A reference numeral 552 designates a 3-state D register which is adapted to temporarily store the data concerning one picture element. The 3-state D register 552 enables the output when the output enable signal $\overline{OEI}$ is in the assert level (low level). When the output enable signal $\overline{OEI}$ is in the deassert level (high level), the 3-state D register 552 produces an output of high impedance.

A reference numeral 553 designates a 2-line buffer memory which is adapted to effect read/write control in accordance with the signal supplied to the input terminal R/W. The control as to whether the output is enabled or takes high impedance is done in accordance with the state of the enable signal $\overline{OE2}$, and address reference is conducted by the address input X and As. A reference numeral 554 designates a BUS buffer.

Figure 32:
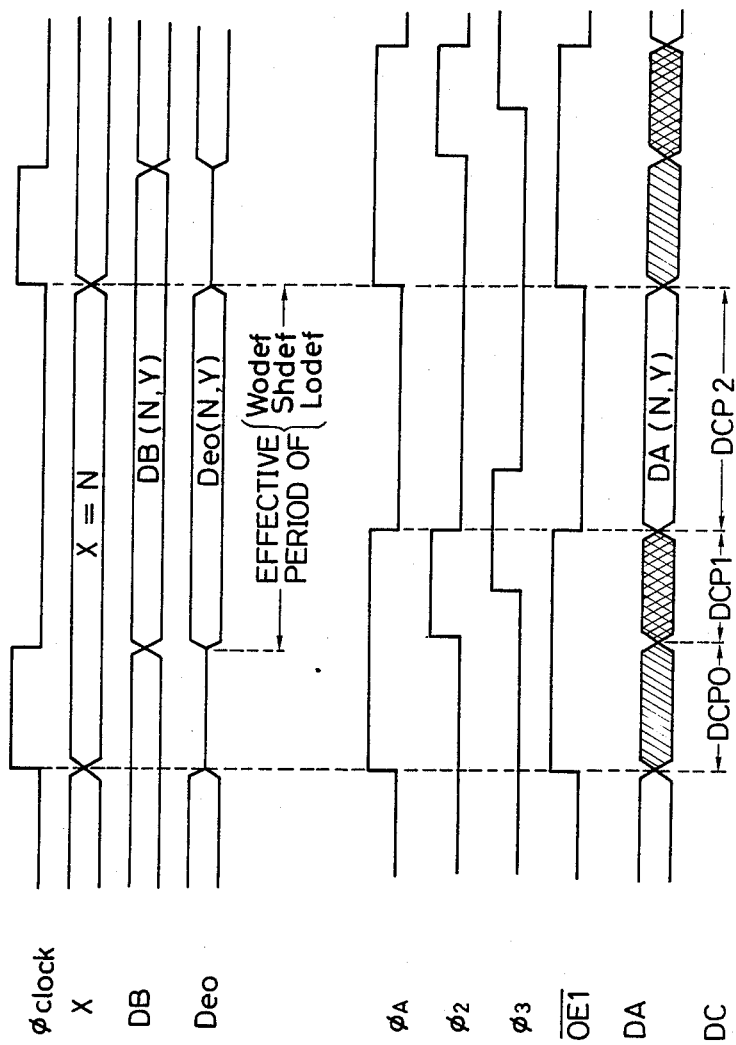
FIG. 32 is a timing chart showing the operation of a defect correction circuit 531.

FIG. 32 is a timing chart illustrating the operation of the defect correction circuit 531 shown in FIG. 31. In this Figure, symbol Φclock represents timing signal which is generated for each of the scanned picture elements within the effective scanning region, while X represents a signal which defines the address (scanning position) in the direction of the main scan. A symbol DB represents a video signal which is output from the buffer memory 520. DB(N,Y) represents the video signal corresponding to the picture element (N,Y), Dco represents a defect signal read from the memory 539, $\Phi_4$, $\Phi_2$, $\Phi_3$, represent timing signals. $\overline{OE1}$ shows the timing signal for controlling the output of the register 552. A symbol DA represents the video signal after correction. DCP0, DCP1 and DCP2 represent a first, second and third BUS cycles, respectively.

The correction of defect is conducted in a manner which will be explained hereinunder.

When there is no defect (when a period of $\Phi_2=1$ is included), the signal Wodef takes the level "1", and the output $\overline{OEO}$ of the NAND gate 549 is maintained at the level zero for a period of $\Phi_1=1$ in accordance with the logical formula of $\overline{OEO}=\overline{Wodef.\Phi_2}$. This signal $\overline{OEO}$ is input to the output enable terminal of the 3-state BUS buffer 551. When the signal $\overline{OEO}$ is zero, the BUS buffer 551 transmits the input signal DB to the output terminal, thus outputting the signal DB to the BUS DC. Conversely, when the signal OEO is at the "1" level, the output of the BUS buffer 551 takes a high impedance, i.e., the BUS DC is disconnected.

In the period of $\Phi_3=1$, the signal Shdef takes the "1" level so that the AND gate 547 is opened to the signal $\Phi_3$, on condition of Shdef=0. In consequence, the data on the BUS DC is written in the register 552 in response to the rise of the signal $\Phi_3$. The timing signal $\Phi_2$ is in the level "1" ($\Phi_2=1$) when the signal $\Phi_3$ rises, so that the signal DB is delivered to the BUS DC through the BUS buffer 551 so as to be written in the register 552.

Thereafter, in the period of $\Phi_2=0$, the level of the signal $\overline{OEO}$ is changed to "1" so that the output from the BUS buffer 551 is prohibited and the level of the signal $\overline{OE1}$ is changed to 0, whereby the register 552 outputs its content to the BUS DC. The signal on the BUS DC is delivered as the corrected video signal DA to the next processing circuit through the BUS buffer 554.

When there is a short defect, the condition of Shdef=1 is met, so that the AND gate 547 is closed and the writing pulse to the register 552 is temporarily prohibited. Therefore, the content of the register 552 is not changed when the defective picture element is scanned. Thus, the data before the detection of the defect still remain in the register 552. In the BUS cycle DCP1 (period of $\Phi_2=1$), no data is output to the BUS DC.

In the next BUS cycle DCP2, the condition OE1=0 is met so that the register 552 is enabled. In consequence, the data obtained immediately before the detection of defect is delivered from the register 552 to the BUS DC. This data is output through the BUS buffer 554 as the corrected signal DA. In the BUS cycle DCP2, the corrected signal is output to the BUS DC when there is no defect (Wodef=1), as well as when the defect is short.

Regarding the line buffer memory 553, data is written in the address designated by the address signals X and As in synchronism with the fall of the signal $\Phi_A$, during the BUS cycle DCP2. The address value As is exclusive OR of the signals Yo and $\Phi_A$. Since the signal Yo if the LSB of the address Y, the value of th address signal As is changed alternatingly between "1" and "1" and vice versa each time the scan over main scan line is finished. In addition, the value of the signal $\Phi_A$ is changed alternatingly between "1" and "1" in the successive BUS cycles DCP1 and DCP2. In consequence, the address referred to in DCP1 and the address referred to in DCP2 are alternatingly changed with each other for all X address values upon completion of each line scan. In consequence, the address which is being written is used as the address for reading of the data obtained through the scanning of the next line. It is, therefore, possible to always maintain the data obtained in the preceding line scanning.

When a long defect exists, the signal $\overline{\text{Lodef}}$ is maintained at the "1" level, while the signal $\overline{\text{OE2}}$ is changed to "1" throughout the BUS cycle DCP1, so that the line buffer memory 553 is changed into the output enable state. In the BUS cycle DCP1, the signal $\Phi_A$ assumes the level "1" so that the line buffer memory 553 is changed into read mode. In consequence, the data obtained from the preceding line and stored in the address designated by the address signals X and As is output to the BUS DC. Furthermore, the signal $\Phi_3$ rises in the BUS cycle DCP1 so that the data on the BUS DC is written in the register 552.

In the BUS cycle DCP2, the signal OE1 is changed to the "1" level, so that the signal written in the register 552 is read and output to the register 552. In this state, the line buffer memory 553 is changed into writing mode, so that the data on the data BUS DC is written in synchronization with the signal $\Phi_A$ and is delivered as the corrected signal DA to the next processing circuit through the BUS buffer 554.

Figure 33:
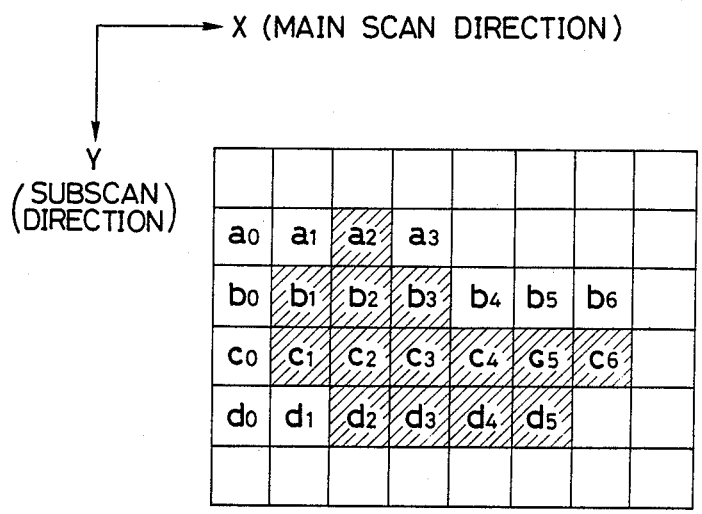
FIG. 33 is an illustration of the process for correcting a defect.

FIG. 33 is a chart illustrating the defect correction procedure conducted by the embodiment shown in FIGS. 29 to 32. The picture elements in the hatched area are those positioned in the defective area. Symbols $a_i$, $b_i$, $c_i$, and $d_i$ are used to identify the picture elements of the respective lines.

In this embodiment, any defect extending in the direction of main scan and having a small length corresponding to two or less picture elements is corrected by substituting the defective picture element or elements by the data obtained from the picture element immediately before the defective element. For instance, the defective picture element $a_2$ shown in FIG. 33 is substituted by $a_1$ by an operation expressed by $a_2=a_1$.

When the defect is so long as to extend over three or more picture elements in the direction of the main scan, a correction is conducted in accordance with methods (1) and (2) shown below.

(1) Data of two picture elements from the beginning end of the defect is regarded as being a short defect and substituted by the data obtained from the picture element immediately before the appearance of the defect.

These two beginning defective picture elements are, for example, $b_2$, $b_1$; $c_2$, $c_1$; or $d_3$, $d_2$ shown in FIG. 33. In each case, the correction is effected by the following substitution.

$$b_2=b_1=c_0, c_2=c=b_0, d_3=d_2=d_1$$

(2) Defective data corresponding to third and following picture elements is regarded as being a long defect, so that it is replaced with the preceding scan data.

These defective picture elements carrying defective data are the elements $b_3$, $c_3$, $c_4$, $c_5$, $c_6$, $d_4$, and $d_5$, shown in FIG. 33. The correction is conducted by the following substitution.

$$c_3=b_3=a_3, d_4=c_4=b_4, d_5=c_5=b_5, c_6=b_6$$

It is thus possible to correct the defect by substituting for defective data the data obtained from the picture elements around the defect. This is done actually by delaying the shift signal by 1 to n clocks, the shift signal being delivered from the shift register 540 (see FIG. 30) to the multi-AND shift register 541, so that the defect extending over nor less picture elements is judged to be a short defect, while the defect extending over n or more picture elements is determined as being a long defect. Namely, the defect carried by n+1 th and the following picture elements in a series of defective picture elements are treated as being a long defect.

Figure 34:
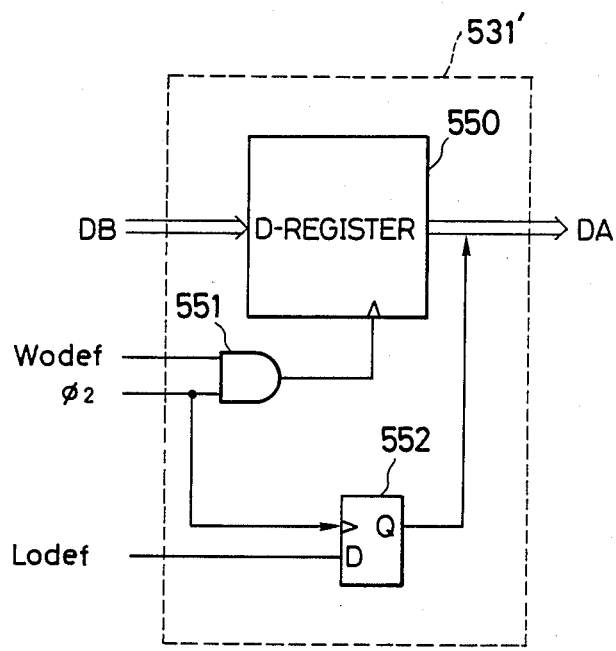
FIG. 34 is a block diagram of another example of a defect correction circuit 31 shown in FIG. 29.

FIG. 34 is a block diagram of another example of the defect correction circuit 531 shown in FIG. 29. In this Fiqure, a reference numeral 550 designates a D-type register, 551 denotes an AND gate, and 552 denotes a D-type flip-flop. The flip-flop 552 is provided for the purpose of attaining synchronism between the Lodef signal and the video data.

In this case, when there is no defect (Wodef=1), the video data DB read from the buffer memory 520 (see FIG. 29) is written in the D type register 550 in synchronism with the signal $\Phi_2$. When the picture element carries a defective data, the condition of Wodef=0 is met, so that the content of the D-type register 550 is not renewed. Thus, the data obtained just before the occurrence of the defect remains in the register 550.

Thus, the D-type register 550 delivers a data DA after correction. However, the effectiveness of the correction is lowered as the length of the defect is increased. In order to discriminate a long defect, therefore, the number of the bits of the data DA is increased by one bit.

In this example, therefore, any defect which has a small length in the direction of the main scan can be corrected by a very simple circuit, while any large defect can be corrected as desired by a subsequent process.

As will be understood from the foregoing description, according to the fourth and fifth embodiments of the present invention, it is possible to correct the data from the defective area on the basis of the size of such a defective area. Thus, the necessary processing can be conducted regardless of the size of the defect.

In addition, the data concerning the position of defect can be stored in the form of signal of small number of bits. This in turn enables the defective area to be searched easily and at a high speed, so that a post processing such as filtering correction by a microprocessor or the like machine can be executed in real time.

Furthermore, any elongated defect can be removed effectively by a very simple circuit arrangement.

It is to be noted also that the fourth and fifth embodiments can be constructed so as to produce a warning when the frequency of appearance of the defect has been increased beyond a predetermined level, so as to enable the user to take a necessary measure such as removal of the dust and other defect.

Since the presence of a defect such as a dust or flaw on the objective original, as well as the position and the size of such defect, can be detected in advance of the video input, the user can take a suitable measure such as suspension of the video input operation.

It is to be noted also that the fourth and fifth embodiments enable any defect on the original to be detected by a comparatively simple optical system.

Figure 35:
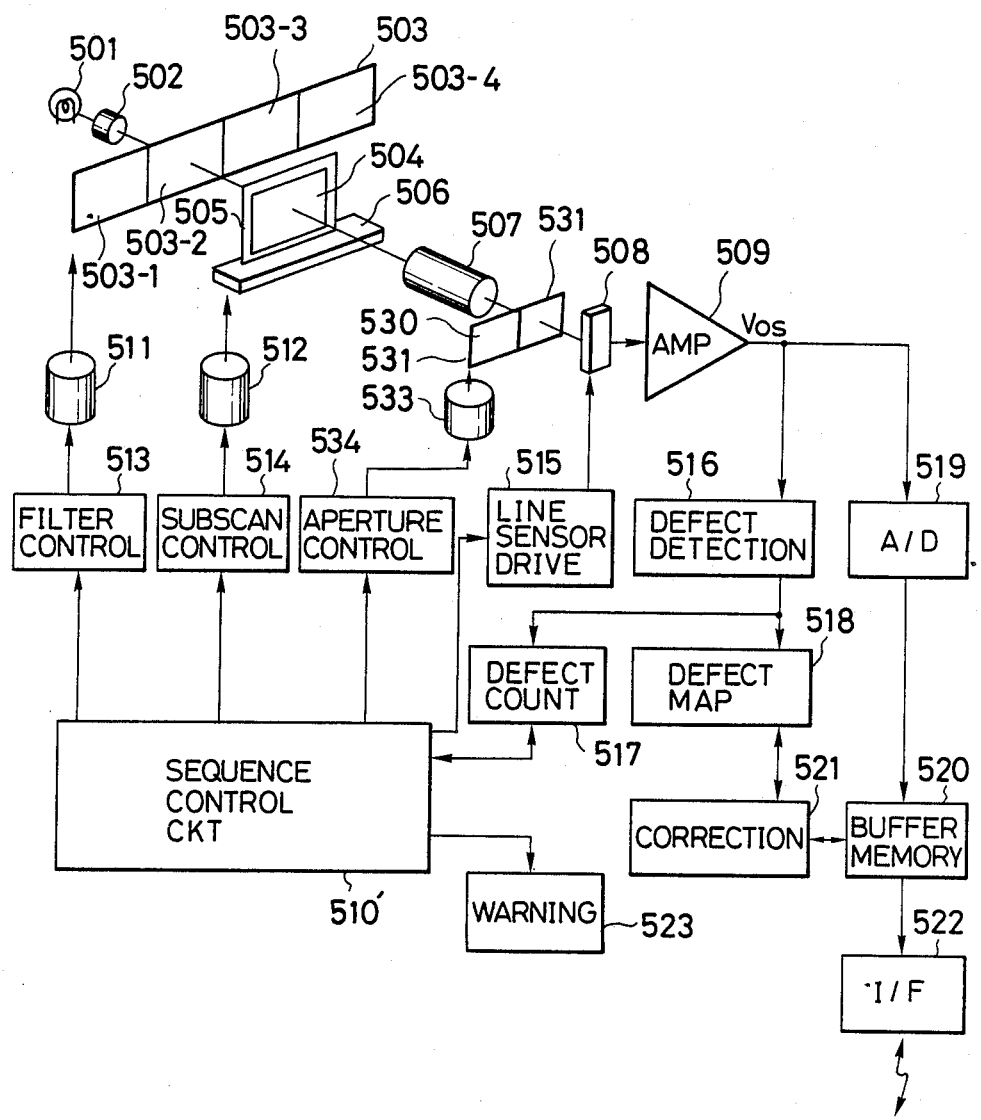
FIG. 35 is an illustration of the whole portion of a sixth embodiment of the present invention.

A sixth embodiment of the invention will be described hereinunder with reference to FIGS. 35 and 36 in which the same reference numerals are used to denote the same parts or members as those appearing in FIG. 26.

This embodiment includes a sequence control circuit 510, an optical low-pass filter 530 (fifth filter), a projection magnification compensating filter 531 (sixth filter), a holder 532 for holding the optical filters 530, 531, a driving means 533 for effecting change-over between the fifth and sixth filters 530 and selection circuit) for delivering a control signal to the driving means 525 for effecting change-over between the fifth and sixth filters 530 and 531.

The fifth filter 530 and the sixth filter 531 may be disposed at any suitable positions between the original 504 and the sensor 508. It is, however, necessary to pay attention so as to avoid any undesirable effect of any defect in the filters 530 and 531 on the image projected onto the sensor 508.

The sixth filter 531 is intended for effecting a compensation such as to maintain a constant projection magnification of the image projected on the sensor regardless of the presence of the fifth filter 530. The sixth filter 531 is usually made of a glass sheet or a similar material having a suitable thickness and refractive index.

The operation of this embodiment is as follows.

In the operation, a main scan is performed by the line sensor 508, while a subscan is carried out by driving the stage 506 carrying the original holder 505 by means of the driving source 512, whereby a two-dimensional scan is conducted.

The transmitting original as the object, e.g., a 35 mm film, is uniformly lighted by the lighting optical system 502 having the illuminating lamp 501 such as a halogen lamp, and the image of the original 504 is formed on the line sensor 508 through the image pickup lens 507. It is possible to effect a color separation of the original image into three colors by using filters which transmit R, G and B colors or cyan, magenta and yellow colors as the second to fourth optical filters 503-2 to 504-2. Subsequently, a main scan is conducted over the image projected onto the line sensor 508. At the same time, a subscan is effected by driving the stage 506 such that the image of the original 504 projected on the line sensor moves in the direction perpendicular to the direction of the main scan performed by the line sensor 508. It is thus possible to effect a two dimensional scan.

For the purpose of changing the filter, filter numbers and filter selection instructions are delivered to the filter selection circuit 513 from the sequence control circuit 510, to thereby effect the filter selection operation so as to control the filter driving means 511 thereby selecting the desired one out of the optical filters 503-1 to 503-4. Similarly, the fifth and sixth filters 530 and 531 are selected.

In this case, an infrared transmitting filter for example is used as the first optical filter 503-1. Since color generating layers of the photographic film transmit most of the infrared rays, the output from the line sensor 508 takes a substantially constant level. However, the level of the output is changed significantly when there is a defect such as dust or flaw on or in the film because in such a case the transmittance is locally changed at the defective position. It is, therefore, possible to easily detect any defect on the film by binarily coding the amplified $V_{os}$ with a first threshold value. By selecting the fifth filter (low pass filter) 530 during detection of the defect, the aperture characteristics of the image forming optical system is widened so that the detection can cover a wide area including the defective region.

A description will be provided here as to the process which is conducted by the sequence control circuit 510'.

The sequence circuit 510' first selects the first filter 503-1 for the detection of defect and also the fifth filter (aperture control filter) 530, and gives an instruction to the subscan control circuit 514 so as to return the stage 506 to the subscan start position. After the completion of selection of the first filter while the stage 506 is returned to the start position, the process proceeds to a mode for detecting defects in the original 504.

In the defect detection mode, any defect such as dust or flaw on the original 504 is detected by the defect detection circuit 516 on the basis of the signal $V_{os}$ obtained by scanning the original 504 with infrared rays, and pieces of data concerning the position where the defect exist are successively stored in the defect map circuit 518. At the same time, the amount of the defect is counted by the defect count circuit 517 in accordance with a predetermined level, and the thus counted extent of the defect is delivered to the sequence control circuit 510'.

When the defect amount exceeds a predetermined level, the sequence control circuit 510 delivers a warning generation instruction to the warning generation circuit 523. The warning generation circuit 523 then generates a warning upon receipt of this instruction.

Then, the sequence control circuit 510' commences the next operation.

After the completion of the operation in the defect detection mode, the operation in the color-separated scanning mode is commenced unless the sequence control is suspended. In this mode, two-dimensional scanning is conducted three times, i.e., once for each of filters 503-2, 503-3 and 503-4 which transmit three colors. The sixth filter 531 also is selected throughout this period.

As the first step, the sequence control circuit 510 delivers an instruction to the aperture control circuit 534 and the optical filter selection control circuit 513 for selecting the sixth filter 531 and the second optical filter 503-2 so as to activate the driving means 533 and 511 thus selecting the sixth filter 531 and the second filter 503-2. The sequence control circuit 510 also delivers an instruction to the subscan control circuit 514 so as to return the stage 506 to the start position. In consequence, the stage driving means 512 is driven to return the stage 506 to the start position.

When the stage 506 is returned to the start position after the selection of filter, the color sensor 508 commences the scanning of the image which is color-separated by the second optical filter 503-2. The signal $V_{os}$ amplified by the amplifier 509 is converted by the A/D converter 519 into digital signals and the thus obtained digital signals are stored temporarily in the buffer memory 520.

The video signals temporarily stored in the buffer memory 520 are corrected by the defect correction circuit 521 in accordance with the defect position data derived from the defect map circuit 518. When the amount of defect in the main scan line is comparatively small, the content of the buffer memory 520 can be corrected by means of for example, a microprocessor during subscan. When a specifically high operation speed is required, it is possible to adopt a hardware construction for a portion of the defect correction circuit 521 so that any small defect can be corrected in real time.

The corrected video data is transferred to an external equipment such as a disc, scanner writer or a frame memory or to a host computer through the interface circuit. The frequency of the data transfer depends on the factors such as the processing speed of the buffer memory or the external equipment. For instance, the data transfer can be conducted for each one line scan or for each frame.

After the completion of the scan of the color separated image processed through the second optical filter 503-2, a control is conducted for selecting the third optical filter 503-3 and for returning the stage 506 to the start position. This control is conducted in the same procedure as that for the second optical filter 503-2 explained before. The same procedure is taken also for the scanning of the image color-separated by the fourth optical filter 503 4, thus completing the operation for picking up three color separated images. During the scanning through these color-separation filters, the sixth filter 531 is left in the optical system.

The construction of the defect detection circuit 516 is the same as that used in the fourth and fifth embodiments.

Figure 36A:
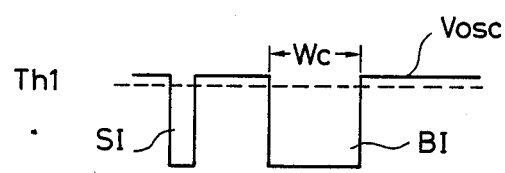
FIGS. 36A and 36B are waveform charts showing the operation of the embodiment shown in FIG. 35.
Figure 36B:
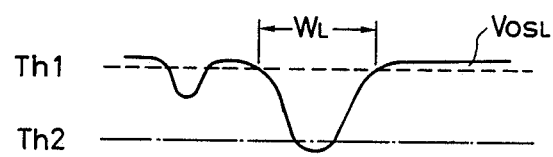

FIGS. 36A and 36B are illustrations for explaining the effect of the fifth filter (low-pass filter) 530 inserted into the optical axis. More specifically, FIG. 36A shows the output signal $V_{osc}$ from the amplifier as obtained from a certain object when the sixth filter is inserted into the optical axis, while FIG. 36B shows the amplifier output $V_{os1}$ as obtained from a certain object when the fifth filter 530 is inserted into the optical axis. Th1 and Th2 show a first threshold value and a second threshold value, respectively. The region of levels below the first threshold value Th1 is regarded as being a defective region.

As will be seen from FIG. 36B, it becomes possible to cover a wider area including the defective region ($W_C<W_L$) by widening the aperture characteristics of the image-forming optical system by inserting the low-pass filter 530.

On the other hand, when the amplifier output is binarily coded at the second threshold level Th2, it is possible to obtain such characteristic as to detect only large defects BI while neglecting small defects SI. In such a case, it is possible to arrange the device such that a warning is generated only in response to the detection of a large defect.

As will be understood from the foregoing description, the sixth embodiment of the present invention enables the very easy detection of various defects without necessitating complicated electrical circuits, by virtue of the means for varying the aperture characteristics during detection of defect.

In a specific form of this embodiment, the infrared image formed on the sensor during the defect detection is optically defocused so that the region obtained by binary coding of the sensor output includes the defective region. It is thus possible to detect any defect without necessitating the use of any electric circuit which widens the region of detection.

By controlling the amount of optical defocus, it is possible to freely change the size of the defect detection region, so that the detection of the region including the defect can be conducted easily even when lustre scanning is not conducted.

A seventh embodiment of the present invention will be explained hereinunder.

In the seventh embodiment, defective picture element data obtained through a scanning with a light of a specific wavelength is stored in a region of an image memory, and video data of respective colors are corrected in accordance with the stored data, the corrected data being then stored in a predetermined region in the image memory.

Thus, in this seventh embodiment, portions of the R, G, B memory are temporarily used for the purpose of storing the defective picture element data. It is, therefore, possible to reduce the necessary capacity of the memory and to conduct a suitable defect detection in advance of the reading of the image data.

The seventh embodiment will be described in more detail.

Figure 37:
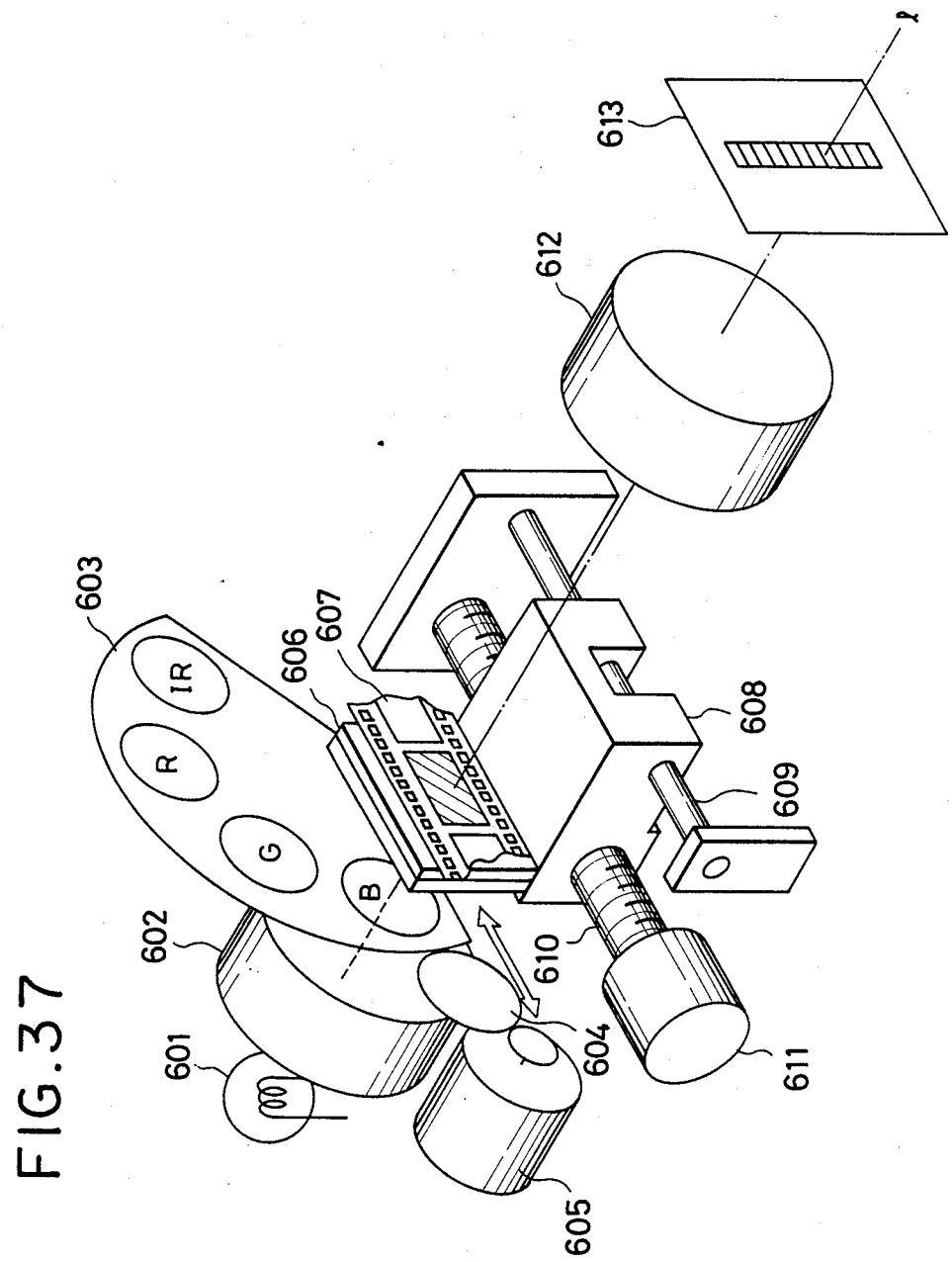
FIG. 37 is a perspective view illustrating the mechanical construction of an image pickup apparatus as a seventh embodiment of the present invention.

FIG. 37 is a schematic perspective view of an image pickup apparatus as the seventh embodiment of the invention. The image pickup apparatus has the following parts: a halogen lamp 601 for illuminating a film original 607; a condenser lens 602; a filter holder 603 adapted for selectively placing one of R, G, B and IR 604 and a motor 605; a holder 606 for holding the film original 607; a stage 608 adapted to be driven in a stepped manner along a guide rail 609 by means of a feed screw 610 and a motor 611 so as to move the holder 606 in the direction of arrow (subscan direction) thereby effecting subscan; and a projection lens 612 for projecting the image of the film original onto the sensor 613 which is a linear image sensor such as a CCD and thus capable of performing reading scanning operation in the direction of main scan.

In this embodiment, the IR filter is used as a light beam separation filter for the purpose of detecting any defect such as dust or flaw which may exist on or in the original film. The R, G and B filters are intended for effecting color-separation of the projected image into red, green and blue colors, respectively.

Figure 38:
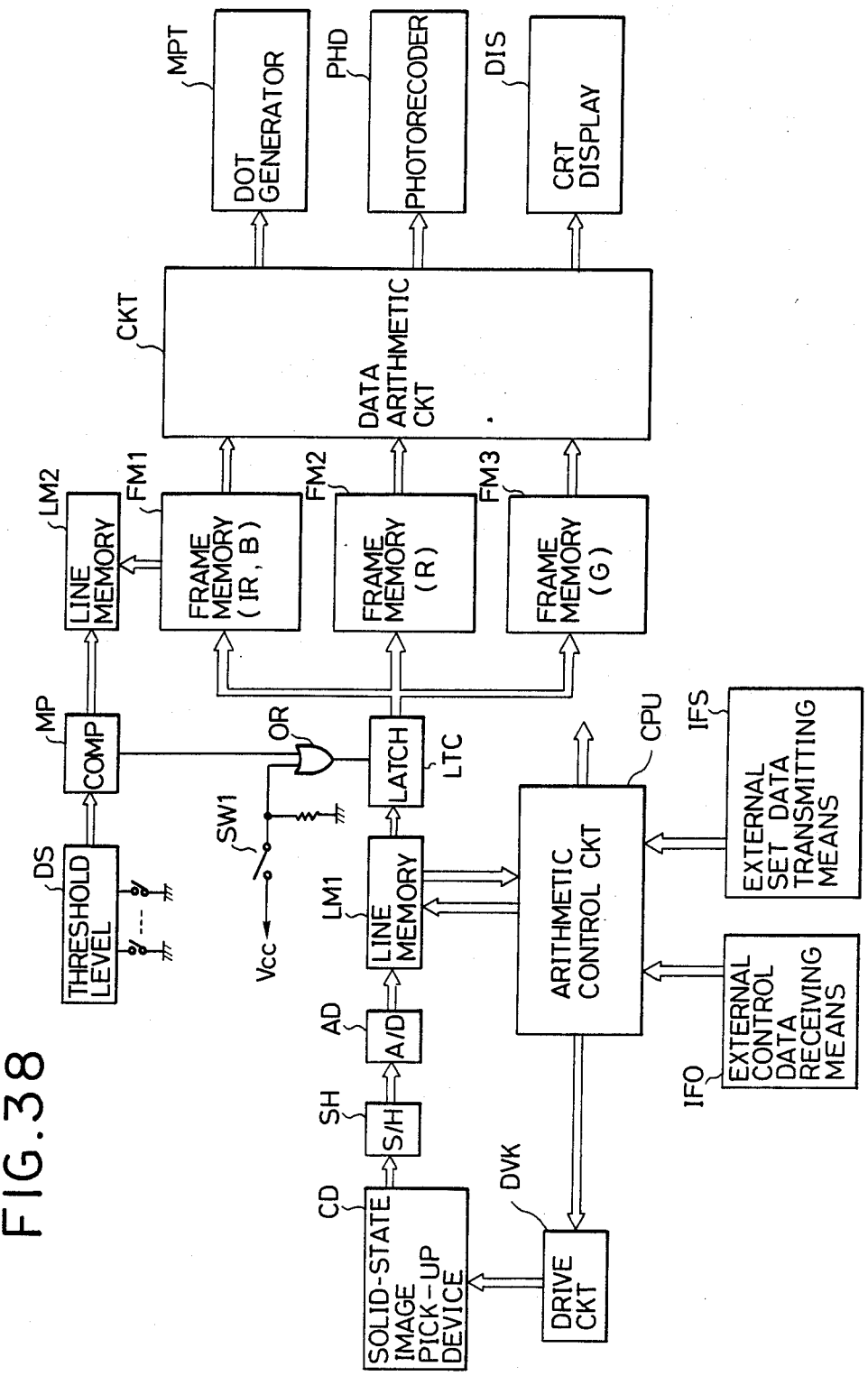
FIG. 38 is a block diagram of an electric circuit incorporated in the seventh embodiment shown in FIG. 37.

FIG. 38 is a block diagram of an electrical circuit for controlling the image pickup apparatus shown in FIG. 37. Referring to this Figure, a uni-dimensional solid-state pickup device CD such as a CCD corresponds to the sensor 613 shown in FIG. 37. The control circuit includes the following components: an image pickup device driving circuit DVK; a sample hold circuit SH; an analog-to-digital converter AD; a first line memory LM1; a central processing unit CPU; external set data transmission means IFS for transmitting external set data such as the accumulation time of the image pickup device; and external control data receiving means for receiving external control data such as film feed control data. Reference character IFO represents an external control data which receives external control data such as film transportation data.

A data latch circuit LTC constituted by a D type flip-flop has the function of delivering the output data from the first line memory LM1 to a BUS after delaying the same by a time corresponding to one clock when the output of the OR gate OR takes the high level. Conversely, when the output of the OR gate is at low level, input of the data concerning the picture element corresponding to this clock is prohibited and the latched data obtained in the period of the clock which is immediately before the present clock, i.e., the data obtained from the picture element which is just before the picture element corresponding to the present clock, is stored again in the memory. The thus stored data is effectively used in the correction of data obtained from a picture element or elements having a defect such as dust or a flaw, as will be explained later.

A first frame memory FM1 is adapted for storing the output data of the latch LTC when the IR filter or the B filter is placed in the optical axis.

A second frame memory FM2 is adapted for storing the output of the latch LTC when the R filter is placed in the optical axis.

A third frame memory FM3 is adapted for storing the output of the latch LTC when the G filter is placed in the optical axis.

A second line memory LM2 reads and stores, in a line-by line fashion, the data stored in the first frame memory, i.e., the stored data obtained from the solid-state image pickup device with the use of the IR filter.

A data level setting device DS provides a threshold value data which is used as the threshold for judging the sensor output obtained through the IR filter as to whether the output includes any data concerning defect such as dust or a flaw. This threshold value data is set by the output from the CPU or manually.

A comparator MP compares the picture element data obtained from the second line memory LM2 (output of solid-state image pickup device output obtained through IR filter) with the threshold so as to judge whether the data includes any data concerning defect such as dust or a flaw. If it is the case that the data of defect is contained, the comparator MP delivers a low-level signal to the OR gate OR.

A switch SW1 is adapted to be closed only when the IR filter is placed in the optical path. Thus, the output of the OR gate OR assumes the high level whenever the IR filter is placed in the optical axis. Therefore, the picture element data read by the solid-state device CD is delivered to and stored in the first frame memory FM1 through the sample hold circuit SH, A/D converter AD, first line memory LM1 and the latch LTC.

A data arithmetic circuit CKT performs predetermined arithmetic operations upon reading corrected color separated picture element data of R, G and B colors from the frame memories FM1 to FM2. The input data supplied to this circuit is converted into outputs of forms optimum for the devices which receive the outputs, e.g., a dot generator MPT for printing, a photorecorder PHD which operates with, for example, a laser beam, a high-quality CRT display DIS and so forth.

As will be understood from the foregoing description, the second line memory LM2, data level setting device DS comparator MP, OR gate OR and the latch circuit LTC in cooperation constitute a defect correction circuit which corrects defective data caused by the presence of a defect such as dust or a flaw on the original.

This defect correction circuit operates in a manner which will be explained hereinunder. For picking up an image data carried by the film original, the infrared filter IR as the light beam separation filter is first set in the pickup optical system. As a result, data concerning any defect such as dust or a flaw on the original is supplied to the data latch LTC through the solid-state image pickup device CD, sample hold SH, A/D converter AD and the first line memory CM1.

When the IR filter is set in the image pickup optical system, the switch SW1 is closed so that the OR gate OR transmits a signal of a high level. Therefore, the input video signal is transmitted to the first frame memory FM1 through the latch LTC, whereby a defect map representing the defect on the original is formed in the first frame memory FM1. Simultaneously, data concerning the size of each defect is sent to the central processing unit CPU through the first line memory FM1. Upon receipt of such data, the central processing unit CPU delivers a discrimination threshold to the data level setting device DS for the purpose of judging whether the picture element in question is defective or not.

Then, the color separation filter for R (red) color is set in the image pickup system. The defect map data recorded in the first frame memory FM1 is delivered in a line by line fashion to the second line memory LM2 in a time sequence. Then, a comparison is conducted by the comparator MP between the data stored in the second line memory and the threshold level set by the data level setting device DS for each of picture elements. In consequence, the OR gate OR outputs a low-level signal in response to the detection of any defective picture element or elements. In such a case, the data latch LTC prohibits the pickup of new data from the first line memory LM1 and, instead, holds the picture element data obtained immediately before the appearance of the defect so as to substitute this data for the data from the defective picture element.

Thus, the R video data which is output from the first line memory LM1 is corrected by the defect correction circuit composed of the elements such as the second line memory LM2, data level setting device DS, comparator MP, OR gate OR and the latch circuit LTC, and the corrected data is stored in the second frame memory FM2. In this manner, the correction of video data from the original is conducted for each of the main scan line, while the original is fed in a stepped manner in the direction of subscan, so that the whole area of the frame is scanned and the video data from the frame is recorded.

The same correcting operation for correcting the data from the defective picture element is conducted also for the video data obtained through the G (green) color-separation filter set in the image pickup optical system, and the corrected data is stored in the third frame memory FM3.

When the B (blue) color-separation filter is set in the image pickup optical system, the defect map stored in the first frame memory is transferred in a line by-line fashion to the second line memory LM2 so as to correct the data from the defective picture element. The thus corrected video data is stored in a corresponding portion of the first frame memory FM1.

As will be understood from the foregoing description, the present invention offers an advantage in that the necessity for the provision of an independent defect map memory for storing data concerning defect such as dust or flaw is eliminated by virtue of the arrangement which enables a portion of the video memories for R, G and B colors to be temporarily used as the memory for the defect map. Consequently, this embodiment can perform correction of video data from defective picture elements having a defect such as dust or a flaw, without requiring any increase in the capacity of the memory to be used.

Needless to say, this embodiment effectively corrects any defective data which is caused by a defect which resides in the image pickup apparatus itself, simultaneously with the correction of defect in the video data attributable to dust or flaw on the film.

First to seventh embodiments of the invention have been described, from which it will be understood that the invention provides an image data reading apparatus which can produce an output image of a high quality without being affected by any dust or a flaw on the original film and without suffering from unfavorable effects due to uneven lighting.

It is to be understood also that the described embodiments are only illustrative and various changes and modifications may be imparted thereto without departing from the scope of the invention which is limited solely by the appended claims.

What we claim is:

1. A film image data reading apparatus comprising:
lighting means for illuminating a film on which an image is recorded;
photoelectric conversion means for converting the light of the image from the film into electrical image data;
wavelength selection means disposed such as to be inserted into and withdrawn from an optical path between said lighting means and said photoelectric conversion means and adapted for transmitting mainly infrared rays;
detection means for detecting the position of dust or a flaw on the film on the basis of the image data outputted from said photoelectric conversion means when said wavelength selection means is inserted in the optical path; and
correction means for correcting the image data outputted from said photoelectric conversion means when said wavelength selection means is withdrawn from the optical path, in accordance with the result of detection conducted by said detection means.

2. A film image data reading apparatus according to claim 1, wherein said detection means is further adapted to measure the illumination intensity distribution produced by said lighting means on the basis of the image data from said photoelectric conversion means.

3. A film image data reading apparatus according to claim 1, wherein said correction means corrects the image data corresponding to the position detected by said detection means.

4. A film image data reading apparatus according to claim 1, further comprising displacement means for materially displacing said photoelectric conversion means from a focal position of a projection optical system when said wavelength selection means is placed in the optical path.

5. An image reading apparatus comprising:
lighting means for illuminating a film on which an image is recorded;
photoelectric conversion means for converting the light of the image from the film into electrical image data;
detecting means for detecting a defective region of a plurality of regions of picture elements of the image on the basis of image data outputted from said photoelectric conversion means;
judging means for judging the size of the defective region detected by said detection means;
defect correction means for correcting the image data included in the defective region, said defect correction means performing the different correction operations in accordance with the size judged by said judging means; and
wavelength selection means for transmitting mainly infrared rays, and wherein said detection means detects the defect region on the basis of the image data outputted from said photoelectric conversion means when said wavelength selection means is disposed in an optical path between said lighting means and said photoelectric conversion means.

6. An image reading apparatus according to claim 5, wherein said judging means is adapted to judge whether the defective region extends over a predetermined number of picture elements in a direction of a main scanning of said photoelectric conversion means.

7. An image reading apparatus according to claim 5, wherein said detection means compares the image data with a predetermined reference signal so as to detect whether the image data is defect data.

8. An image reading apparatus according to claim 5, further comprising informing means for informing the user of the detection result of said detection means.

9. An image reading apparatus comprising:
lighting means for illuminating a film on which an image is recorded;
photoelectric conversion means for converting the light of the image from the film into electrical image data;
detection means for detecting a defective picture element of the image on the basis of the image data outputted from said photoelectric conversion means;
judging means for judging whether each of a plurality of regions into which the image is divided contains the defective picture element, in accordance with the result of detection conducted by said detection means;
correction means for correcting the image data included in the region which is judged by said judging means to contain the defective picture element; and wavelength selection means for transmitting mainly infrared rays, and wherein said detection means detects the defective picture element on the basis of the image data outputted from said photoelectric conversion means when said wavelength selection means is disposed in an optical path between said lighting means and said photoelectric conversion means.

10. An image reading apparatus according to claim 9, wherein said photoelectric conversion means outputs the image data line, and said judging means conducts the judging operation line by line.

11. An image reading apparatus according to claim 9, wherein said detecting means compares the image data with a predetermined reference signal so as to detect a defective picture element.

12. An image reading apparatus according to claim 9, further comprising memory means for storing data representing the region which is judged by said judging means to contain the defective picture element.

13. An image reading apparatus according to claim 9, wherein said correction means performs the correction by using the image data of at least one picture element in the vicinity of the defective picture element.

14. A film image data reading apparatus according to claim 1, wherein said detection means compares the image data with a predetermined reference signal so as to detect the position of dust or a flaw on the film.

15. A film image data reading apparatus according to claim 1, further comprising memory means for storing data representing the position of dust or a flaw detected by said detection means.

16. A film image data reading apparatus according to claim 1, wherein said correction means performs the correction by using the image data in the vicinity of the position of the dust or the flaw.

17. An image reading apparatus according to claim 5, wherein said defect correction means performs the correction by using the image data in the vicinity of the defective region.

18. An image reading apparatus according to claim 17, wherein said defect correction means performs the correction by using different position image data in accordance with the size of the defective region.

* * * * *

UNITED STATES PATENT AND TRADEMARK OFFICE
CERTIFICATE OF CORRECTION

PATENT NO. : 4,933,983

DATED : June 12, 1990

INVENTOR(S) : AKIRA HIRAMATSU, ET AL.

Page 1 of 10

It is certified that error appears in the above-identified patent and that said Letters Patent is hereby corrected as shown below:

IN THE DRAWINGS

SHEET 11 OF 38

FIG. 11, "PESPONSIVE" should read --RESPONSIVE--.

SHEET 16 OF 38

FIG. 16, "SENOR" should read --SENSOR--.

SHEET 17 OF 38

FIG. 17, "POSITONS" should read --POSITIONS--.

SHEET 24 OF 38

FIG. 24, "SENOR" should read --SENSOR--.

SHEET 25 OF 38

FIG. 25, "POSITONS" should read --POSITIONS--.

SHEET 38 OF 38

FIG. 38, "PHOTORECODER" should read --PHOTORECORDER--.

COLUMN 1

Line 38, "arranging" should read --arranging for--.
Line 52, "that" should read --so that--.

UNITED STATES PATENT AND TRADEMARK OFFICE
CERTIFICATE OF CORRECTION

PATENT NO. : 4,933,983

DATED : June 12, 1990

INVENTOR(S) : AKIRA HIRAMATSU, ET AL.

It is certified that error appears in the above-identified patent and that said Letters Patent is hereby corrected as shown below:

COLUMN 2

Line 2, "appear" should read --appears--.
    Line 11, "appear" should read --appears--.
    Line 31, "the" should be deleted.

COLUMN 3

Line 8, "sub scanning" should read --subscanning--.

COLUMN 4

Line 29, "non exposed" should read --non-exposed--.

COLUMN 5

Line 48, "detected;" should read --detected,--.

COLUMN 6

Line 15, "be" should read --can be--.

COLUMN 7

Line 7, "above mentioned" should read --above-mentioned--.
    Line 24, "itches" should read --switches--.
    Line 30, "therewith" should read --therewith.--.
    Line 42, "shafts 31a" should read --shafts 31a and 32a--.
    Line 45, "shafts 31a and 31b" should read --shafts 31a and 32a--.
    Line 46, "shows" should read --show--.

UNITED STATES PATENT AND TRADEMARK OFFICE
CERTIFICATE OF CORRECTION

PATENT NO. : 4,933,983
DATED : June 12, 1990
INVENTOR(S) : AKIRA HIRAMATSU, ET AL.

It is certified that error appears in the above-identified patent and that said Letters Patent is hereby corrected as shown below:

COLUMN 8

Line 67, "takes" should read --assumes--.

COLUMN 9

Line 4, "light receiving" should read --light-receiving--.
    Line 47, "light shielding" should read --light-shielding--.
    Line 49, "pass through" should read --pass-through--.

COLUMN 10

Line 44, "and" should read --and,--.
    Line 47, "is" should read --are--.
    Line 62, "scan start" should read --scan-start--.
    Line 65, "scan start" should read --scan-start--.

COLUMN 11

Line 21, "one" should read -- one- --.
    Line 29, "sensor 107" should read --sensor 11-- and "one line" should read --one-line--.
    Line 33, "data" should read --data.--.

COLUMN 12

Line 6, "pass through" should read --pass-through--.

UNITED STATES PATENT AND TRADEMARK OFFICE
CERTIFICATE OF CORRECTION

PATENT NO. : 4,933,983
DATED : June 12, 1990
INVENTOR(S) : AKIRA HIRAMATSU, ET AL.

It is certified that error appears in the above-identified patent and that said Letters Patent is hereby corrected as shown below:

COLUMN 13

Line 17, "elements" should read --element--.

COLUMN 14

Line 55, "receipt" should read --receipt of--.
Line 57, "scan start" should read --scan-start--.

COLUMN 15

Line 9, "one line" should read --one-line--.
Line 14, "one line" should read --one-line--.
Line 24, "Step" should read --In Step--.

COLUMN 16

Line 6, "operation" should read --operations--.
Line 57, "address" should read --an address--.
Line 62, "video" should read --Video--.
Line 63, "thereto" should read --thereto.--.
Line 65, "$S_{ij}=(S_{i-1,j}+S_{i,j-r1}+S_{i,j+1}+S_{i+1,j})/4$" should read --$S_{ij}=(S_{i-1,j}+S_{i,j-1}+S_{i,j+1}+S_{i+1,j})/4$--.
Line 68, "address" should read --addresses--.

COLUMN 17

Line 6, "in = 1 to m" should read --i = 1 to m--.
Line 7, "When" should read --¶ When--.
Line 11, "procedure" should read --procedures--.

UNITED STATES PATENT AND TRADEMARK OFFICE
CERTIFICATE OF CORRECTION

PATENT NO. : 4,933,983
DATED : June 12, 1990
INVENTOR(S) : AKIRA HIRAMATSU, ET AL.

It is certified that error appears in the above-identified patent and that said Letters Patent is hereby corrected as shown below:

COLUMN 18

Line 1, "and" should read --any--.
    Line 24, "is" should read --as--.

COLUMN 19

Line 4, "flow" should read --the flow--.

COLUMN 20

Line 17, "into" should read --to--.
    Line 45, "low pass" should read --low-pass--.
    Line 54, "high speed" should read --high-speed--.
    Line 60, "FIG. 25" should read --FIG. 26--.

COLUMN 21

Line 8, "503 4;" should read --503-4;--.
    Line 16, "presence" should read --the presence--.
    Line 42, "two dimensional" should read --two-dimensional--.
    Line 51, "504-2." should read --503-4.--.
    Line 52, "main" should read --a main--.
    Line 54, "subscan" should read --a subscan-- and "age" should read --stage--.
    Line 58, "two dimensional" should read --two-dimensional--.
    Line 66, "filter 503 1." should read --filter 503-1.--.

UNITED STATES PATENT AND TRADEMARK OFFICE
CERTIFICATE OF CORRECTION

PATENT NO. : 4,933,983

DATED : June 12, 1990

INVENTOR(S) : AKIRA HIRAMATSU, ET AL.

It is certified that error appears in the above-identified patent and that said Letters Patent is hereby corrected as shown below:

COLUMN 22

Line 50, "color separated" should read
        --color-separated--.

COLUMN 23

Line 35, "main" should read --the main--.
    Line 51, "color sepa-" should read --color-sepa- --.
    Line 55, "the:" should read --the--.
    Line 60, "color separated" should read
        --color-separated--.
    Line 66, "voltage $V_{ref}$," should read --voltage $V_{ref}$;--.

COLUMN 24

Line 2, "$\Phi$" should read --$\Phi$clock--.
    Line 12, "cf" should read --of--.
    Line 42, "an" should read --scan--.
    Line 51, ""Dn"—the" should read --Dn-th--.
    Line 55, ""1" or "1"" should read --"1" or "0"--.

COLUMN 25

Line 3, "of" (first occurrence) should be deleted.
    Line 13, "show" should read --shows--.
    Line 29, "memory means 33" should read
        --memory means 533--.

UNITED STATES PATENT AND TRADEMARK OFFICE
CERTIFICATE OF CORRECTION

PATENT NO. : 4,933,983

DATED : June 12, 1990

INVENTOR(S) : AKIRA HIRAMATSU, ET AL.

It is certified that error appears in the above-identified patent and that said Letters Patent is hereby corrected as shown below:

COLUMN 26

Line 34, "output at in" should read --output at the address x in the direction of main scan and address y in--.
    Line 38, "value "1"" should read --value "0"--.

COLUMN 27

Line 34, "no defect" should read --no-defect--.
    Line 37, "receive" should read --receives--.
    Line 67, "clocks Φclock" should read --clock Φclock--.

COLUMN 28

Line 53, "OE0" should read --$\overline{OE0}$--.

COLUMN 29

Line 12, "OE1=0" should read --$\overline{OE1}$=0--.
    Line 25, "if" should read --is--.
    Line 26, "th" should read --the--.
    Line 27, ""1" and "1"" should read --"1" and "0"--.
    Line 30, ""1" and "1"" should read --"1" and "0"--.
    Line 41, "signal OE2" should read --signal $\overline{OE2}$--.
    Line 42, "to "1"" should read --to "0"--.
    Line 52, "OE1" should read --$\overline{OE1}$--.
    Line 53, "the "1" level," should read --the "0" level,--.

UNITED STATES PATENT AND TRADEMARK OFFICE
CERTIFICATE OF CORRECTION

PATENT NO. : 4,933,983

DATED : June 12, 1990

INVENTOR(S) : AKIRA HIRAMATSU, ET AL.

It is certified that error appears in the above-identified patent and that said Letters Patent is hereby corrected as shown below:

COLUMN 30

Line 37, "nor" should read --n or--.
    Line 39, "as being" should read --to be--.
    Line 45, "Fiqure" should read --Figure--.

COLUMN 31

Line 35, "510" should read --510'--.
    Line 39, "filters 530 and selection" should read
        --filters 530 and 531, and an aperture control
        circuit 534 (low-pass filter selection--.

COLUMN 32

Line 2, "503-2 to 504-2." should read --503-2 to 503-4.--.
    Line 9, "two dimensional" should read
        --two-dimensional--.
    Line 29, "(low pass" should read --(low-pass--.
    Line 57, "circuit 510" should read --circuit 510'--.

COLUMN 33

Line 3, "circuit 510" should read --circuit 510'--.
    Line 8, "second" should read --second optical--.
    Line 9, "circuit 510" should read --circuit 510'--.
    Line 40, "one line" should read --one-line--.
    Line 42, "color sepa-" should read --color-sepa- --.

UNITED STATES PATENT AND TRADEMARK OFFICE
CERTIFICATE OF CORRECTION

PATENT NO. : 4,933,983
DATED : June 12, 1990
INVENTOR(S) : AKIRA HIRAMATSU, ET AL.

It is certified that error appears in the above-identified patent and that said Letters Patent is hereby corrected as shown below:

COLUMN 33

Line 50, "filter 503 4" should read --filter 503-4--.
    Line 51, "color separated" should read
         --color-separated--.

COLUMN 34

Line 18, "defect." should read --a defect.--.
    Line 24, "electric" should read --electrical--.
    Line 54, "R, G, B and IR" should read --R, G, B and IR
         filters in the optical path through operation
         of an idler--.

COLUMN 35

Line 19, "D type" should read --D-type--.
    Line 45, "line-by line" should read --line-by-line--.

COLUMN 36

Line 5, "color separated" should read --color-separated--.
    Line 6, "FM1 to FM2." should read --FM1 to FM3.--.
    Line 15, "device DS" should read --device DS,--.
    Line 46, "line by line" should read --line-by-line--.
    Line 50, "of" should read --of the--.

UNITED STATES PATENT AND TRADEMARK OFFICE
CERTIFICATE OF CORRECTION

PATENT NO. : 4,933,983
DATED : June 12, 1990
INVENTOR(S) : AKIRA HIRAMATSU, ET AL.

It is certified that error appears in the above-identified patent and that said Letters Patent is hereby corrected as shown below:

COLUMN 37

Line 11, "line by-line" should read --line-by-line--.

COLUMN 39

Line 13, "line," should read --line by line,--.

Signed and Sealed this

Eighth Day of June, 1993

Attest:

MICHAEL K. KIRK

Attesting Officer

Acting Commissioner of Patents and Trademarks